US010616239B2

(12) United States Patent
Allen et al.

(10) Patent No.: US 10,616,239 B2
(45) Date of Patent: Apr. 7, 2020

(54) GEO-FENCE AUTHORIZATION PROVISIONING

(71) Applicant: Snap Inc., Santa Monica, CA (US)

(72) Inventors: Nicholas Richard Allen, Santa Monica, CA (US); Sheldon Chang, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/074,029

(22) Filed: Mar. 18, 2016

(65) Prior Publication Data

US 2016/0277419 A1    Sep. 22, 2016

Related U.S. Application Data

(60) Provisional application No. 62/134,689, filed on Mar. 18, 2015.

(51) Int. Cl.
*H04L 29/06* (2006.01)
*H04L 12/58* (2006.01)
(Continued)

(52) U.S. Cl.
CPC ............ *H04L 63/107* (2013.01); *H04L 51/20* (2013.01); *H04L 51/32* (2013.01);
(Continued)

(58) Field of Classification Search
CPC .......... G01R 33/5608; G01R 33/56341; G05B 19/054; G05B 2219/1182;
(Continued)

(56) References Cited

U.S. PATENT DOCUMENTS

| 666,223 A | 1/1901 | Shedlock |
|---|---|---|
| 4,581,634 A | 4/1986 | Williams |

(Continued)

FOREIGN PATENT DOCUMENTS

| CA | 2887596 A1 | 7/2015 |
|---|---|---|
| CA | 2894332 C | 8/2018 |

(Continued)

OTHER PUBLICATIONS

US 10,075,404 B1, 09/2018, Allen et al. (withdrawn)
(Continued)

*Primary Examiner* — Abiy Getachew
(74) *Attorney, Agent, or Firm* — Schwegman Lundberg & Woessner, P.A.

(57) ABSTRACT

A system includes a communication module that receives a request to post content to an event gallery associated with an event. The request in turn includes geo-location data for a device sending the content, and identification data identifying the device or a user of the device. The system further has an event gallery module to perform a first authorization operation that includes determining that the geo-location data corresponds to a geo-location fence associated with an event. The event gallery module also performs a second authorization operation that includes using the identification data to verify an attribute of the user. Finally, based on the first and second authorization operations, the event gallery module may selectively authorize the device to post the content to the event gallery.

19 Claims, 10 Drawing Sheets

(51) Int. Cl.
   *H04W 4/021*   (2018.01)
   *H04W 4/02*    (2018.01)
   *H04W 4/18*    (2009.01)
   *H04W 12/06*   (2009.01)
   *H04W 12/00*   (2009.01)

(52) U.S. Cl.
   CPC ......... *H04L 63/0876* (2013.01); *H04W 4/021* (2013.01); *H04W 4/023* (2013.01); *H04W 4/185* (2013.01); *H04W 12/06* (2013.01); *H04W 12/00503* (2019.01)

(58) Field of Classification Search
   CPC ........ G05B 2219/25461; G06T 1/0007; G06T 5/006; G09G 2370/16; H04B 5/0062; H04L 67/22; H04L 51/20; H04L 51/32; H04L 63/0876; H04L 63/107; H04W 4/008; H04W 12/00503; H04W 12/06; H04W 4/021; H04W 4/023; H04W 4/185; G06F 11/0727; G06F 11/0751; G06F 11/1469; G06F 11/1474; G06F 2201/82; G06F 2201/84; Y10S 378/901
   See application file for complete search history.

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Ben-Yehezkel et al. | |
| 6,075,535 A | 6/2000 | Fitzhugh et al. | |
| 6,154,764 A | 11/2000 | Nitta et al. | |
| 6,158,044 A | 12/2000 | Tibbetts | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,586 B2 | 11/2002 | Ogilvie et al. | |
| 6,487,601 B1 | 11/2002 | Hubacher et al. | |
| 6,499,016 B1 | 12/2002 | Anderson | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,701,347 B1 | 3/2004 | Ogilvie | |
| 6,711,608 B1 | 3/2004 | Ogilvie | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,004,394 B2 | 2/2006 | Kim | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,142,823 B1 | 11/2006 | Logue et al. | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,243,163 B1 | 7/2007 | Friend et al. | |
| 7,269,426 B2 | 9/2007 | Kokkonen et al. | |
| 7,278,168 B1 | 10/2007 | Chaudhury et al. | |
| 7,280,658 B2 | 10/2007 | Amini et al. | |
| 7,315,823 B2 | 1/2008 | Bröndrup | |
| 7,349,768 B2 | 3/2008 | Bruce et al. | |
| 7,356,564 B2 | 4/2008 | Hartselle et al. | |
| 7,376,715 B2 | 5/2008 | Cunningham et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,478,402 B2 | 1/2009 | Christensen et al. | |
| 7,496,347 B2 | 2/2009 | Puranik | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,703,140 B2 | 4/2010 | Nath et al. | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,856,449 B1 | 12/2010 | Martino et al. | |
| 7,912,896 B2 | 3/2011 | Wolovitz et al. | |
| 7,934,156 B2 | 4/2011 | Forstall et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads et al. | |
| 8,136,028 B1 | 3/2012 | Loeb et al. | |
| 8,146,001 B1 | 3/2012 | Reese | |
| 8,161,115 B2 | 4/2012 | Yamamoto | |

(56) References Cited

U.S. PATENT DOCUMENTS

| | | |
|---|---|---|
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,686,962 B2 | 4/2014 | Christie |
| 8,687,021 B2 | 4/2014 | Bathiche et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Roote et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,063,638 B1 | 6/2015 | Schrock et al. |
| 9,083,770 B1 | 7/2015 | Dröse et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 | 1/2017 | Duggal et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,133,705 B1 | 11/2018 | Allen et al. |
| 10,182,311 B2 | 1/2019 | Sehn |
| 10,200,813 B1 | 2/2019 | Allen et al. |
| 10,284,508 B1 | 5/2019 | Allen et al. |
| 10,311,916 B2 | 6/2019 | Sehn |
| 10,416,845 B1 | 9/2019 | Allen et al. |
| 10,448,201 B1 | 10/2019 | Sehn et al. |
| 10,476,830 B2 | 11/2019 | Allen et al. |
| 2001/0025316 A1 | 9/2001 | Oh |
| 2001/0028787 A1 | 10/2001 | Nomura et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0171669 A1 | 11/2002 | Meron et al. |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |

(56) References Cited

U.S. PATENT DOCUMENTS

| | | |
|---|---|---|
| 2003/0126215 A1 | 7/2003 | Udell |
| 2003/0148773 A1 | 8/2003 | Spriestersbach et al. |
| 2003/0163370 A1 | 8/2003 | Chen et al. |
| 2003/0164856 A1 | 9/2003 | Prager et al. |
| 2003/0217106 A1 | 11/2003 | Adar et al. |
| 2003/0217118 A1 | 11/2003 | Kobayashi et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0199402 A1 | 10/2004 | Walker et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0004630 A1 | 1/2006 | Criddle et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0127054 A1 | 6/2006 | Matsuyama |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0106706 A1 | 5/2007 | Ahrens et al. |
| 2007/0136228 A1 | 6/2007 | Petersen |
| 2007/0092668 A1 | 8/2007 | Harris et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0012987 A1 | 1/2008 | Hirata et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0046476 A1 | 2/2008 | Anderson et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Nguyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222158 A1 | 9/2008 | Saika |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0263103 A1 | 10/2008 | Mcgregor et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Van De Sluis |
| 2009/0177588 A1 | 7/2009 | Marchese |
| 2009/0187825 A1 | 7/2009 | Sandquist et al. |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0011316 A1 | 1/2010 | Sar et al. |
| 2010/0039505 A1 | 2/2010 | Inoue et al. |

(56) References Cited

U.S. PATENT DOCUMENTS

| | | |
|---|---|---|
| 2010/0062794 A1 | 3/2010 | Han |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0100729 A1 | 4/2010 | Read et al. |
| 2010/0113065 A1 | 5/2010 | Narayan et al. |
| 2010/0115281 A1* | 5/2010 | Camenisch ............ H04L 9/302 713/175 |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185987 A1 | 7/2010 | Yang et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199227 A1 | 8/2010 | Xiao et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0085059 A1 | 4/2011 | Noh |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0296474 A1 | 12/2011 | Babic |
| 2011/0306387 A1 | 12/2011 | Moon |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0070045 A1 | 3/2012 | Vesper et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0158532 A1 | 6/2012 | Fitzsimmons |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0201362 A1 | 8/2012 | Crossan et al. |
| 2012/0203849 A1 | 8/2012 | Collins et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0311623 A1 | 12/2012 | Davis et al. |
| 2012/0319904 A1 | 12/2012 | Lee et al. |

(56) References Cited

U.S. PATENT DOCUMENTS

| | | |
|---|---|---|
| 2012/0323933 A1 | 12/2012 | He et al. |
| 2012/0324018 A1* | 12/2012 | Metcalf ............... H04W 4/21 709/206 |
| 2013/0006759 A1 | 1/2013 | Srivastava et al. |
| 2013/0008238 A1 | 1/2013 | Hogeg et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1* | 5/2013 | Bosworth ............... G06Q 50/01 709/204 |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290337 A1 | 10/2013 | Lansford et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1* | 12/2013 | Berberat ............... H04L 67/18 709/204 |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0029034 A1 | 1/2014 | Toriyama |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0082651 A1 | 3/2014 | Sharifi |
| 2014/0089264 A1 | 3/2014 | Talagala et al. |
| 2014/0089314 A1 | 3/2014 | Iizuka et al. |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0298210 A1 | 10/2014 | Park et al. |
| 2014/0304622 A1 | 10/2014 | Jorasch et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0331188 A1 | 11/2014 | Sandstrom et al. |
| 2014/0359024 A1 | 12/2014 | Spiegel |
| 2014/0359032 A1 | 12/2014 | Spiegel et al. |
| 2014/0372844 A1 | 12/2014 | Zumkhawala |
| 2014/0379683 A1 | 12/2014 | Bazaz |
| 2015/0020086 A1 | 1/2015 | Chen et al. |
| 2015/0040011 A1 | 2/2015 | Chun |
| 2015/0046278 A1 | 2/2015 | Pei et al. |
| 2015/0055197 A1 | 2/2015 | Romanoff et al. |
| 2015/0063724 A1 | 3/2015 | Ikeda et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0127754 A1 | 5/2015 | Clark et al. |
| 2015/0130178 A1 | 5/2015 | Clements |
| 2015/0142753 A1* | 5/2015 | Soon-Shiong ...... G06F 17/3002 707/673 |
| 2015/0169827 A1 | 6/2015 | Laborde |
| 2015/0172534 A1 | 6/2015 | Miyakawa et al. |
| 2015/0177937 A1 | 6/2015 | Poletto et al. |
| 2015/0178260 A1 | 6/2015 | Brunson |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0248683 A1 | 9/2015 | Walkingshaw |
| 2015/0261917 A1 | 9/2015 | Smith |
| 2015/0312184 A1 | 10/2015 | Langholz et al. |
| 2015/0326510 A1 | 11/2015 | Tomlinson et al. |
| 2015/0350136 A1 | 12/2015 | Flynn, III et al. |
| 2015/0365795 A1 | 12/2015 | Allen et al. |
| 2015/0367233 A1 | 12/2015 | Hicks et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0034253 A1 | 2/2016 | Bang et al. |
| 2016/0048369 A1 | 2/2016 | Zenoff |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |

(56) References Cited

U.S. PATENT DOCUMENTS

| | | |
|---|---|---|
| 2016/0092962 A1 | 3/2016 | Wasserman et al. |
| 2016/0099901 A1 | 4/2016 | Allen et al. |
| 2016/0105387 A1 | 4/2016 | Jackson |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0253833 A1 | 9/2016 | Lew |
| 2016/0253912 A1 | 9/2016 | Heilman et al. |
| 2016/0321708 A1 | 11/2016 | Sehn |
| 2016/0352659 A1 | 12/2016 | Krishnamoorth |
| 2016/0359957 A1 | 12/2016 | Laliberte |
| 2016/0359987 A1 | 12/2016 | Laliberte |
| 2017/0006094 A1 | 1/2017 | Abou Mahmoud et al. |
| 2017/0061308 A1 | 3/2017 | Chen et al. |
| 2017/0111617 A1 | 4/2017 | Kuwahara et al. |
| 2017/0149717 A1 | 5/2017 | Sehn |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0374003 A1 | 12/2017 | Allen et al. |
| 2017/0374508 A1 | 12/2017 | Davis et al. |
| 2018/0103002 A1 | 4/2018 | Sehn |
| 2018/0316575 A1 | 11/2018 | Son et al. |
| 2019/0237106 A1 | 8/2019 | Sehn |
| 2019/0342699 A1 | 11/2019 | Sehn et al. |

FOREIGN PATENT DOCUMENTS

| | | |
|---|---|---|
| CA | 2910158 C | 6/2019 |
| CN | 102930107 A | 2/2013 |
| CN | 103200238 A | 7/2013 |
| CN | 107637099 A | 1/2018 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 10-2035405 B1 | 10/2019 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013008238 | 1/2013 |
| WO | WO-2013008251 A2 | 1/2013 |
| WO | WO 2013045753 A1 | 4/2013 |
| WO | WO-2014068573 A1 | 5/2014 |
| WO | WO-2014093668 A1 | 6/2014 |
| WO | WO-2014115136 A1 | 7/2014 |
| WO | WO-2014172388 A1 | 10/2014 |
| WO | WO-2014194262 A2 | 12/2014 |
| WO | WO-2015192026 A1 | 12/2015 |
| WO | WO-2016007285 A1 | 1/2016 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO2016179166 A1 | 11/2016 |
| WO | WO-2016179235 A1 | 11/2016 |
| WO | WO-2017176739 A1 | 10/2017 |
| WO | WO2017176992 A1 | 10/2017 |
| WO | WO-2018005644 A1 | 1/2018 |

OTHER PUBLICATIONS

US 10,425,370 B2, 09/2019, Allen et al. (withdrawn)
"U.S. Appl. No. 14/494,226, Non Final Office Action dated Sep. 7, 2017", 36 pgs.
"U.S. Appl. No. 14/494,226, Response filed Jul. 7, 2017 to Final Office Action dated Mar. 7, 2017", 13 pgs.
"U.S. Appl. No. 4/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Dec. 21, 2016 to Final Office Action dated Aug. 24, 2016", 17 pgs
"U.S. Appl. No. 14/578,271, Notice of Allowance dated Aug. 1, 2017", 5 pgs.
"U.S. Appl. No. 14/612,692, Final Office Action dated Aug. 25, 2017", 18 pgs.
"U.S. Appl. No. 15/152,975, Final Office Action dated Jun. 30, 2017", 17 pgs.
"U.S. Appl. No. 15/224,355, Non Final Office Action dated Sep. 6, 2017", 30 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.
"U.S. Appl. No. 15/224,377, Non Final Office Action dated Aug. 4, 2017", 41 pgs.
"U.S. Appl. No. 15/224,383, Non Final Office Action dated Aug. 30, 2017", 26 pgs.
"U.S. Appl. No. 15/298,806, Response filed Sep. 12 2017 to Non Final Office Action dated Jun. 12, 2017", 12 pgs.
"U.S. Appl. No. 15/416,846, Notice of Allowance dated Jul. 19, 2017", 9 pgs.
"International Application Serial No. PCT/US2015/065785, International Preliminary Report on Patentability dated Jun. 29, 2017", 7 pgs.
"International Application Serial No. PCT/US2015/065821, International Preliminary Report on Patentability dated Jun. 29, 2017", 5 pgs.
"A Whole New Story", [Online]. Retrieved from the Internet: <https://www.snap.com/en-US/news/>, (2017), 13 pgs.
"Adding a watermark to your photos", eBay, [Online]. Retrieved from the Internet<URL:http://pages.ebay.com/help/sell/pictures.html>, (accessed May 24, 2017), 4 pgs.
"U.S. Appl. No. 14/494,226, Examiner Interview Summary dated Oct. 27, 2016", 3 pgs.
"U.S. Appl. No. 14/494,226, Final Office Action dated Mar. 7, 2017", 34 pgs.
"U.S. Appl. No. 14/494,226, Non Final Office Action dated Sep. 12, 2016", 32 pgs.
"U.S. Appl. No. 14/494,226, Response filed Dec. 12, 2016 to Non Final Office Action dated Sep. 12, 2016", 16 pgs.
"U.S. Appl. No. 14/529,064, Non Final Office Action dated Apr. 6, 2017", 25 pgs.
"U.S. Appl. No. 14/539,391, Notice of Allowance dated Mar. 5, 2015", 17 pgs.
"U.S. Appl. No. 14/548,590, Advisory Action dated Nov. 18, 2016", 3 pgs.
"U.S. Appl. No. 14/548,590, Final Office Action dated Jul. 5, 2016", 16 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.

(56) References Cited

OTHER PUBLICATIONS

"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/612,692, Response filed May 3, 2017 to Non Final Office Action dated Jan. 3, 2017", 18 pgs.
"U.S. Appl. No. 14/634,417, Non Final Office Action dated Jun. 8, 2017", 17 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Response filed Mar. 4, 2016 to Non Final Office Action dated Dec. 4, 2015", 11 pgs.
"U.S. Appl. No. 14/841,987, Notice of Allowance dated Mar. 29, 2017", 17 pgs.
"U.S. Appl. No. 14/967,472, Response filed Jun. 7, 2017 to Final Office Action dated Mar. 10, 2017", 12 pgs.
"U.S. Appl. No. 15/152,975, Response filed Jun. 12, 2017 to Non Final Office Action dated Jan. 12, 2017", 13 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224,359, Preliminary Amendment filed Apr. 19, 2017", 8 pgs.
"U.S. Appl. No. 15/298,806, Non Final Office Action dated Jun. 12, 2017", 26 pgs.
"BlogStomp", [Online]. Retrieved from the Internet: <URL:http://stompsoftware.com/blogstomp>, (accessed May 24, 2017), 12 pgs.
"Canadian Application Serial No. 2,910,158, Response filed Apr. 11, 2017 to Office Action dated Dec. 15, 2016", 21 pgs.
"Cup Magic Starbucks Holiday Red Cups come to life with AR app", [Online]. Retrieved from the Internet: <http://www.blastradius.com/work/cup-magic>, (2016), 7 pgs.
"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"InstaPlace Photo App Tell the Whole Story", [Online]. Retrieved from the Internet; <https://youtu.be/uF_gFkg1hBM>, (Nov. 8, 2013), 113 pgs.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.
"International Application Serial No. PCT/US2015/053811, International Preliminary Report on Patentability dated Apr. 13, 2017", 9 pgs.
"International Application Serial No. PCT/US2015/056884, International Preliminary Report on Patentability dated May 4, 2017", 8 pgs.
"International Application Serical No. PCT/US 2015/037251, International Search Report dated Sep. 29, 2015", 7 pgs.

"Introducing Snapchat Stories", [Online]. Retrieved from the Internet:<https://www.youtube.com/watch?v=88Cu3yN-LIM>, (Oct. 3, 2013), 92 pgs.
"Macy's Believe-o-Magic", {Online}. Retrieved from the Internet: <https://www.youtube.com/watch?v=xvzRXy3J0Z0>, (Nov. 7, 2011), 102 pgs.
"Macy's Introduces Augmented Reality Experience in Stores across Country as Part of Its 2011 "Believe" Campaign", [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.
"Starbucks Cup Magic", {Onliine}. Retrieved from the Internet: <https://www.youtube.com/watch?v=RWwQXi9RG0w>, (Nov. 8, 2011), 87 pgs.
"Starbucks Cup Magic for Valentine's Day", {Online}. Retrieved from the Internet: <https://www.youtube.com/watch?v=8nvqOzjq10w>, (Feb. 6, 2012), 88 pgs.
"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", [Online]. Retrieved from the Internet: URL<https://techcrunch.com/2011/09/08/mobli-filters>, (Sep. 8, 2011), 10 pgs.
Janthong, Isaranu, "Android App Review Thailand", [Online]. Retrieved from the Internet<http://www.android-free-app-review.com/2013/01/instaplace-android-google-play-store.html>, (Jan. 23, 2013), 9 pgs.
MacLeod, Duncan, "Macys Believe-o-Magic App", [Online]. Retrieved from the Internet:<URL:http://theinspirationroom.com/daily/2011/macys-believe-o-magic-app>, (Nov. 14, 2011), 10 pgs.
MacLeod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.
Notopoulos, Katie, "A Guide to the New Snapchat Filters and Big Fonts", [Online]. Retrieved from the Internet<https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", [Online]. Retrieved from the Internet:<https://techcrunch.com/2013/12/20/snapchat-adds-filters-new-font-and-for-some-reason-time-temperature-and-speed-overlays/>, (Dec. 20, 2013), 12 pgs.
Shein, Esther, "Ephemeral Data", Communications of the ACM vol. 56 | No. 9, (Sep. 2013), 20-22.
Tripathi, Rohit, "Watermark Images in PHP and Save File on Server", [Online]. Retrieved from the Internet: <URL:http://code.rohitink.com/2012/12/28/watermark-images-in-php-and-save-file-on-server/, (Dec. 28, 2012), 4 pgs.
"U.S. Appl. No. 14/578,271, Notice of Allowance dated Dec. 7, 2016", 7 pgs.
"U.S. Appl. No. 14/612,692, Non Final Office Action dated Jan. 3, 2017", 17 pgs.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Response filed Mar. 2, 2017 to Final Office Action dated Jan. 31, 2017", 23 pgs.
"U.S. Appl. No. 14/967,472, Final Office Action dated Mar. 10, 2017", 15 pgs.
"U.S. Appl. No. 15/152,975, Non Final Office Action dated Jan. 12, 2017", 36 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.

(56) References Cited

OTHER PUBLICATIONS

"U.S. Appl. No. 15/416,846, Preliminary Amendment filed Feb. 18, 2017", 10 pgs.
"Canadian Application Serial No. 2,910,158, Office Action dated Dec. 15, 2016", 5 pgs.
"International Application Serial No. PCT/US2015/035591, International Preliminary Report on Patentability dated Dec. 22, 2016", 7 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
"U.S. Appl. No. 14/505,478, Corrected Notice of Allowance dated Jul. 22, 2016", 2 pgs.
"U.S. Appl. No. 14/505,478, Notice of Allowance dated Aug. 25, 2016", 11 pgs.
"U.S. Appl. No. 14/529,064, Final Office Action dated Aug. 24, 2016", 23 pgs.
"U.S. Appl. No. 14/529,064, Response filed Jul. 18, 2016 to Non Final Office Action dated Apr. 18, 2016", 20 pgs.
"U.S. Appl. No. 14/612,692, Examiner Interview Summary dtaed Jul. 6, 2016", 4 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Response filed Nov. 14, 2015 to Final Office Action dated Aug. 15, 2016", 15 pgs.
"U.S. Appl. No. 14/634,417, Non Final Office Action dated Aug. 30, 2016", 23 pgs.
"U.S. Appl. No. 14/634,417, Response filed Nov. 30, 2016 to Non Final Office Action dated Aug. 30, 2016", 18 pgs.
"U.S. Appl. No. 14/738,069, Notice of Allowance dated Aug. 17, 2016", 6 pgs.
"U.S. Appl. No. 14/808,283, Notice of Allowance dated Jul. 14, 2016", 8 pgs.
"U.S. Appl. No. 14/967,472, Non Final Office Action dated Sep. 8, 2016", 11 pgs.
"U.S. Appl. No. 14/967,472, Response filed Dec. 5, 2016 to Non Final Office Action dated Sep. 8, 2016", 11 pgs.
"U.S. Appl. No. 15/208,460, Supplemental Preliminary Amendment filed Jul. 18, 2016", 8 pgs.
"U.S. Appl. No. 15/298,806, Preliminary Amendment filed Oct. 21, 2016", 8 pgs.
"Canadian Application Serial No. 2,894,332, Office Action dated Aug. 16, 2016", 4 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
U.S. Appl. No. 15/152,975, filed May 12, 2016, Multichannel System.
U.S. Appl. No. 15/137,608, filed Apr. 25, 2016, Gallery of Messages From Individuals with a Shared Interest.
"U.S. Appl. No. 15/702,511, Preliminary Amendment filed Sep. 15, 2017", 13 pgs.
"U.S. Appl. No. 14/634,417, Response filed Sep. 21, 2017 to Non Final Office Action dated Jun. 8, 2017", 16 pgs.
"U.S. Appl. No. 14/634,417, Examiner Interview Summary dated Aug. 7, 2017", 3 pgs.
"International Application Serial No. PCT/US2016/023085, International Preliminary Report on Patentability dated Sep. 28, 2017", 8 pgs.
"U.S. Appl. No. 15/224,343, Non Final Office Action dated Oct. 4, 2017", 26 pgs.
"U.S. Appl. No. 15/224,312, Non Final Office Action dated Oct. 11, 2017", 29 pgs.
"U.S. Appl. No. 15/298,806, Final Office Action dated Oct. 24, 2017", 15 pgs.
"U.S. Appl. No. 15/224,355, Examiner Interview Summary dated Oct. 25, 2017", 3 pgs.

"U.S. Appl. No. 15/224,383, Examiner Interview Summary dated Oct. 25, 2017", 3 pgs.
"U.S. Appl. No. 14/634,417, Notice of Allowance dated Oct. 25, 2017", 9 pgs.
"U.S. Appl. No. 15/787,467, Preliminary Amendment filed Oct. 26, 2017", 11 pgs.
"U.S. Appl. No. 14/578,271, Corrected Notice of Allowance dated Oct. 30, 2017", 2 pgs.
U.S. Appl. No. 14/612,692, filed Feb. 3, 2015, Multichannel System.
U.S. Appl. No. 14/505,478, filed Oct. 2, 2014, Ephemeral Gallery of Ephemeral Messages.
U.S. Appl. No. 14/578,271, filed Dec. 19, 2014, Gallery of Video set to an Audio Time line.
U.S. Appl. No. 14/634,417, filed Feb. 27, 2015, Ephemeral Gallery of Ephemeral Messages with Opt-In Performance.
U.S. Appl. No. 14/304,855, U.S. Pat. No. 9,113,301, filed Jun. 13, 2014, Geo-Location Event Gallery.
U.S. Appl. No. 14/967,472, filed Dec. 14, 2015, Gallery of Videos Set to an Ausio Time Line.
U.S. Appl. No. 14/738,069, filed Jun. 12, 2015, Geo-Location Based Event Gallery.
U.S. Appl. No. 14/529,064, filed Oct. 30, 2014, Priority Based Placement of Messages in Geo-Location Based Event Gallery.
U.S. Appl. No. 14/578,258, filed Dec. 19, 2014, Gallery of Messages From Individuals with a Shared Interest.
U.S. Appl. No. 14/523,728, U.S. Pat. No. 9,094,137, filed Oct. 24, 2014, Priority Based Placement of Messages in a Geo-Location Based Event Gallery.
U.S. Appl. No. 14/808,283, filed Jul. 24, 2015, Prioritization of Messages within Gallery.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/505,478, Advisory Action dated Apr. 14, 2015", 3 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015" 10 pgs.
"U.S. Appl. No. 14/523,728, Non Final Office Action dated Sec. 12, 2014", 10 pgs.
"U.S. Appl. No. 14/523,728, Notice of Allowance dated Mar. 24, 2015", 8 pgs
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.

(56) References Cited

OTHER PUBLICATIONS

"U.S. Appl. No. 14/529,064, Final Office Action dated Aug. 11, 2015", 23 pgs.
"U.S. Appl. No. 14/529,064, Non Final Office Action dated Mar. 12, 2015", 20 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Restriction Requirement dated Feb. 2, 2015", 5 pgs.
"U.S. Appl. No. 14/529,064,Response filed Oct. 12, 2015 to Final Office Action dated Aug. 11, 2015", 19 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/612,692, Examiner Interview Summary dated Jan. 29, 2016", 5 pgs.
"U.S. Appl. No. 14/612,692, Examiner Interview Summary dated Aug. 14, 2015", 3 pgs.
"U.S. Appl. No. 14/612,692, Final Office Action dated Nov. 23, 2015", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692. Response filed Oct. 19, 2015 to Non Final Office Action dated Jul. 20, 2015", 11 pgs.
"U.S. Appl. No. 14/704,212, Non Final Office Action dated Dec. 4, 2015", 17 pgs.
"U.S. Appl. No. 14/808,283, Preliminary Amendment filed Jul. 24, 2015", 8 pgs.
"U.S. Appl. No. 14/967,472, Preliminary Amendment efiled Dec. 15, 2015", 6 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"iVisit Mobile Getting Started", iVisit (Dec. 4, 2013), 1-16.
"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
Castelluccia, Claude, et a "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Melanson, Mike, "This text message will self destruct in 60 seconds", readwrite.com. [Online]. Retrieved from the Internet:<http://readwrite.com/2011/02/11/this_text_message_will_self_destruct_in_60_seconds>, (Feb. 18, 2015).
Sawers, Paul, "Snapchat for ios lets you send photosto friends and set how long they're visible for", http://thenextweb.com/apps/2012/05/07/ snapchat-for-ios-lets-you-send-photos-to-friends-and-set-how-long-theyre-visible-for, (May 2012), 1-3 pgs.
Sawers, Paul, "Snapchatfor iOS Lets You Send Photos to Friends and Set How long They're Visible for", [Online]. Retrieved from the Internet<http://thenextweb.com/apps/2012/05/07/Snapchat-for-ios-lets-you-send-photos-to-friends-and-set-how-long-theyre-visiblefor/#! xCjrp>,, (May 7, 2012), 1-5.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
"U.S. Appl. No. 14/308,855, Final Office Action dated Feb. 18, 2015", 10 pgs.
"U.S. Appl. No. 14/505,478, Response filed Mar. 4, 2016 to Non Final Office Action dated Apr. 4, 2015", 12 pgs.
"U.S. Appl. No. 14/523,728, Non Final Office Action dated Dec. 12, 2014", 10 pgs.
"U.S. Appl. No. 14/967,472, Preliminary Amendment dated Dec. 15, 2015." 6 pgs.
"International Application Serial No. PCT/US2015/035591, Internatational Search Report dated Aug. 11, 2015", 5 pgs.
"International Application Serial No. PCT/US2015/056884, Written Opinion dated Dec. 22, 2015",6 pg.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Sawers, Paul, "Snapchat for ios lets you send photosto friends and set how long they're visible for", http://thenextweb.com/apps/2012/05/07/ snapc-for-ios-lets-you-send-photos-to-friends-and-set-how-long-theyre-visible-for, (May 2012), 1-3 pgs.
"U.S. Appl. No. 15/137,608, Non Final Office Action dated Nov. 2, 2018", 10 pgs.
"U.S. Appl. No. 15/224,355, Non Final Office Action dated Dec. 20, 2018", 14 pgs.
"U.S. Appl. No. 15/224,377, Response filed Dec. 17, 2018 to Non Final Office Action dated Jun. 15, 2018", 13 pgs.
"U.S. Appl. No. 15/224,383, Response Filed Dec. 5, 2018 to Non Final Office Action dated Jul. 5, 2018", 16 pgs.
"U.S. Appl. No. 15/702,511, Notice of Allowance dated Oct. 26, 2018", 7 pgs.
"U.S. Appl. No. 15/729,582, Final Office Action dated Dec. 13, 2018", 14 pgs.
"U.S. Appl. No. 15/946,990, Non Final Office Action dated Dec. 3, 2018", 10 pgs.
"U.S. Appl. No. 14/529,064, Non Final Office Action dated Jul. 13, 2018", 38 pgs.
"U.S. Appl. No. 14/612,692, Notice of Allowance dated Jul. 5, 2018", 11 pgs.
"U.S. Appl. No. 14/967,472, Final Office Action dated Jun. 25, 2018", 14 pgs.
"U.S. Appl. No. 14/967,472, Response filed Sep. 21, 2018 to Final Office Action dated Jun. 25, 2018", 11 pgs.
"U.S. Appl. No. 15/152,975, Final Office Action dated Jul. 2, 2018", 19 pgs.
"U.S. Appl. No. 15/152,975, Non Final Office Action dated Sep. 28, 2018", 28 pgs.
"U.S. Appl. No. 15/152,975, Response filed Sep. 19, 2018 to Final Office Action dated Jul. 2, 2018", 14 pgs.
"U.S. Appl. No. 15/224,312, Non Final Office Action dated Oct. 22, 2018", 15 pgs.

(56) References Cited

OTHER PUBLICATIONS

"U.S. Appl. No. 15/224,312, Response filed Aug. 20, 2018 to Final Office Action dated Apr. 20, 2018", 16 pgs.
"U.S. Appl. No. 15/224,343, Non Final Office Action dated Sep. 4, 2018", 20 pgs.
"U.S. Appl. No. 15/224,343, Response filed Jul. 19, 2018 to Final Office Action dated Apr. 19, 2018", 16 pgs.
"U.S. Appl. No. 15/224,355, Response filed Sep. 24, 2018 to Final Office Action dated Apr. 24, 2018", 19 pgs.
"U.S. Appl. No. 15/224,359, Non Final Office Action dated Sep. 28, 2018", 15 pgs.
"U.S. Appl. No. 15/224,359, Response filed Sep. 4, 2018 to Final Office Action dated Apr. 2, 2018", 14 pgs.
"U.S. Appl. No. 15/224,365, Response filed Oct. 2, 2018 to Final Office Action dated Apr. 2, 2018", 15 pgs.
"U.S. Appl. No. 15/224,372, Non Final Office Action dated Sep. 14, 2018", 20 pgs.
"U.S. Appl. No. 15/224,372, Response filed Aug. 3, 2018 to Final Office Action dated Apr. 3, 2018", 14 pgs.
"U.S. Appl. No. 15/224,383, Examiner Interview Summary dated Aug. 15, 2018", 4 pgs.
"U.S. Appl. No. 15/224,383, Non Final Office Action dated Jul. 5, 2018", 19 pgs.
"U.S. Appl. No. 15/298,806, Examiner Interview Summary dated Aug. 13, 2018", 3 pgs.
"U.S. Appl. No. 15/298,806, Notice of Allowance dated Sep. 19, 2018", 5 pgs.
"U.S. Appl. No. 15/298,806, Response filed Aug. 10, 2018 to Non Final Office Action dated May 17, 2018", 15 pgs.
"U.S. Appl. No. 15/787,467, Corrected Notice of Allowability dated Sep. 24, 2018", 2 pgs.
"U.S. Appl. No. 15/787,467, Notice of Allowance dated Aug. 31, 2018", 8 pgs.
"U.S. Appl. No. 15/787,467, Response filed Jul. 18, 2018 to Non Final Office Action dated Apr. 18, 2018", 12 pgs.
Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005). 2 pgs.
"U.S. Appl. No. 14/494,226, Appeal Brief filed Mar. 1, 2019 in response to Final Office Action dated Jun. 1, 2018", 29 pgs.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/967,472, Corrected Notice of Allowability dated Mar. 18, 2019", 3 pgs.
"U.S. Appl. No. 14/967,472, Notice of Allowance dated Jan. 24, 2019", 6 pgs.
"U.S. Appl. No. 15/137,608, Amendment and Response filed Jan. 25, 2019 to Non Final Office Action dated Nov. 2, 2018", 13 pgs.
"U.S. Appl. No. 15/152,975, Examiner Interview Summary dated Feb. 4, 2019", 7 pgs.
"U.S. Appl. No. 15/152,975, Response filed Jan. 28, 2019 to Non Final Office Action dated Sep. 28, 2018", 17 pgs.
"U.S. Appl. No. 15/224,312, Final Office Action dated Apr. 11, 2019", 15 pgs.
"U.S. Appl. No. 15/224,312, Response filed Feb. 22, 2019 to Non Final Office Action dated Oct. 22, 2018", 14 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,359, Final Office Action dated Apr. 11, 2019", 15 pgs.
"U.S. Appl. No. 15/224,359, Respone filed Feb. 28, 2019 to Non Final Office Action dated Aug. 28, 2018", 16 pgs.
"U.S. Appl. No. 15/224,365, Non Final Office Action dated Jan. 3, 2019", 11 pgs.
"U.S. Appl. No. 15/224,372, Final Office Action dated Mar. 6, 2019", 17 pgs.
"U.S. Appl. No. 15/224,372, Resonse filed Jan. 16, 2019 to Non Final Office Action dated Sep. 14, 2018", 18 pgs.
"U.S. Appl. No. 15/224,377, Examiner Interview Summary dated Mar. 4, 2019", 5 pgs.
"U.S. Appl. No. 15/224,377, Final Office Action dated Feb. 6, 2019", 14 pgs.
"U.S. Appl. No. 15/224,383, Final Office Action dated Jan. 14, 2019", 15 pgs.
"U.S. Appl. No. 15/702,511, Notice of Allowance dated Mar. 26, 2019", 7 pgs.
"U.S. Appl. No. 15/946,990, Response filed Feb. 20, 2019 to Non Final Office Action dated Dec. 3, 2018", 11 pgs.
"U.S. Appl. No. 16/204,886, Non Final Office Action dated Jan. 4, 2019", 8 pgs.
"U.S. Appl. No. 16/204,886, Resposne filed Apr. 2, 2019 to Non Final Office Action dated Jan. 4, 2019", 8 pgs.
"Canadian Application Serial No. 2,910,158, Response filed Dec. 6, 2018 to Office Action dated Jun. 6, 2018", w/ English Claims, 18 pgs.
"Korean Application Serial No. 10-017-7029861, Notice of Preliminary Rejection dated Jan. 17, 2019", w/ English Translation, 9 pgs.
"Korean Application Serial No. 10-017-7029861, Response filed Mar. 15, 2019 to Notice of Preliminary Rejection dated Jan. 17, 2019", w/ English Claims, 20 pgs.
"U.S. Appl. No. 14/494,226, Final Office Action dated Jun. 1, 2018", 33 pgs.
"U.S. Appl. No. 14/529,064, Response filed May 25, 2018 to Final Office Action dated Jan. 25, 2018", 20 pgs.
"U.S. Appl. No. 15/224,377, Non Final Office Action dated Jun. 15, 2018", 19 pgs.
"U.S. Appl. No. 15/224,383, Response filed Jun. 14, 2018 to Final Office Action dated Feb. 14, 2018", 14 pgs.
"U.S. Appl. No. 15/729,582, Non Final Office Action dated May 25, 2018", 14 pgs.
"U.S. Appl. No. 16/000,657, Preliminary Amendment filed Jun. 6, 2018", 8 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
Chen, Datong, et al., "Protecting Personal Identification in Video", Protecting Privacy in Video Surveillance, Springer-Verlag London Ltd., (2009), 115-128.
"U.S. Appl. No. 14/505,478, Corrected Notice of Allowance dated May 18, 2016", 2 pgs.
"U.S. Appl. No. 14/505,478, Notice of Allowance dated Apr. 28, 2016", 11 pgs.
"U.S. Appl. No. 14/529,064, Non Final Office Action dated Apr. 18, 2016", 21 pgs.
"U.S. Appl. No. 14/578,258, Examiner Interview Summary dated Nov. 25, 2015", 3 pgs.
"U.S. Appl. No. 14/612,692, Non Final Office Action dated Mar. 28, 2016", 15 pgs.
"U.S. Appl. No. 14/612,692, Response filed Jun. 28, 2016 to Non Final Office Action dated Mar. 28, 2016", 14 pgs.
"U.S. Appl. No. 14/738,069, Non Final Office Action dated Mar. 21, 2016", 12 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 15/137,608, Preliminary Amendment filed Apr. 26, 2016", 6 pgs.
"U.S. Appl. No. 15/152,975, Preliminary Amendment filed May 19, 2016", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"U.S. Appl. No. 14/612,692, Examiner Interview Summary dated May 14, 2018", 3 pgs.

(56) References Cited

OTHER PUBLICATIONS

"U.S. Appl. No. 14/612,692, Response Filed May 9, 2018 to Non Final Office Action dated Jan. 9, 2018", 15 pgs.
"U.S. Appl. No. 14/634,417, Notice of Allowance dated May 22, 2018", 9 pgs.
"U.S. Appl. No. 14/967,472, Response filed Mar. 16, 2018 Non Final Office Action dated Jan. 12, 2018", 13 pgs.
"U.S. Appl. No. 15/152,975, Examiner Interview Summary dated May 14, 2018", 3 pgs.
"U.S. Appl. No. 15/152,975, Response Filed May 10, 2018 to Non Final Office Action dated Jan. 10, 2018", 13 pgs.
"U.S. Appl. No. 15/224,312, Final Office Action dated Apr. 20, 2018", 22 pgs.
"U.S. Appl. No. 15/224,343, Final Office Action dated Apr. 19, 2018", 20 pgs.
"U.S. Appl. No. 15/224,343, Response filed Mar. 5, 2018 to Non Final Office Action dated Oct. 4, 2017", 23 pgs.
"U.S. Appl. No. 15/224,355, Final Office Action dated Apr. 24, 2018".
"U.S. Appl. No. 15/224,355, Response filed Mar. 6, 2018 to Non Final Office Action dated Sep. 6, 2017", 25 pgs.
"U.S. Appl. No. 15/224,359, Final Office Action dated Apr. 2, 2018", 18 pgs.
"U.S. Appl. No. 15/224,365, Final Office Action dated Apr. 2, 2018", 19 pgs.
"U.S. Appl. No. 15/224,372, Final Office Action dated Apr. 3, 2018", 18 pgs.
"U.S. Appl. No. 15/298,806, Non Final Office Action dated May 17, 2018", 16 pgs.
"U.S. Appl. No. 15/787,467, Non Final Office Action dated Apr. 18, 2018", 17 pgs.
"European Application Serial No. 16716090.2, Response filed May 21, 2018 to Communication pursuant to Rules 161(1) and 162 EPC dated Nov. 10, 2017", w/ English Claims, 89 pgs.
"U.S. Appl. No. 14/967,472, Corrected Notice of Allowability dated Apr. 24, 2019", 3 pgs.
"U.S. Appl. No. 15/946,990, Final Office Action dated May 9, 2019", 11 pgs.
"U.S. Appl. No. 15/137,608, Final Office Action dated May 13, 2019", 10 pgs.
"U.S. Appl. No. 15/729,582, Response filed May 13, 2019 to Final Office Action dated Dec. 13, 2018", 9 pgs.
"U.S. Appl. No. 15/224,383, Response filed May 14, 2019 to Final Office Action dated Jan. 14, 2019", 15 pgs.
"U.S. Appl. No. 16/204,886, Notice of Allowance dated May 15, 2019", 9 pgs.
"U.S. Appl. No. 15/152,975, Notice of Allowance dated May 17, 2019", 13 pgs.
"U.S. Appl. No. 15/224,355, Response filed May 20, 2019 to Non Final Office Action dated Dec. 20, 2018", 13 pgs.
"U.S. Appl. No. 15/224,365, Response filed Jun. 3, 2019 to Non-Final Office Action dated Jan. 3, 2019", 12 pgs.
"U.S. Appl. No. 15/224,377, Response filed Jun. 6, 2019 to Final Office Action dated Feb. 6, 2019", 10 pgs.
U.S. Appl. No. 16/376,598, filed Apr. 5, 2019, Gallery of Videos Set to an Audio Time Line.
U.S. Appl. No. 16/000,657, filed Jun. 5, 2018, Ephemeral Gallery of Ephemeral Messages with Opt-In Permanence.
"Android Getting Started Guide", Voxer Business, [Online]. Retrieved from the Internet: <https://voxer.com/assets/AndroidGuide.pdf>, (Feb. 1, 2014), 18 pgs.
"U.S. Appl. No. 14/494,226, Examiner Interview Summary dated Dec. 20, 2017", 2 pgs.
"U.S. Appl. No. 14/494,226, Response filed Jan. 8, 2018 to Non Final Office Action dated Sep. 7, 2017", 15 pgs.
"U.S. Appl. No. 14/529,064, Final Office Action dated Jan. 25, 2018", 39 pgs.
"U.S. Appl. No. 14/578,271, Notice of Allowability dated Nov. 29, 2017", 3 pgs.
"U.S. Appl. No. 14/612,692, Examiner Interview Summary dated Nov. 13, 2017", 13 pgs.
"U.S. Appl. No. 14/612,692, Non Final Office Action dated Jan. 9, 2018", 19 pgs.
"U.S. Appl. No. 14/612,692, Response Filed Nov. 22, 2017 to Final Office Action dated Aug. 25, 2017", 11 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/967,472, Non Final Office Action dated Jan. 12, 2018", 17 pgs.
"U.S. Appl. No. 15/152,975, Examiner Interview Summary dated Nov. 13, 2017", 13 pgs.
"U.S. Appl. No. 15/152,975, Non Final Office Action dated Jan. 10, 2018", 18 pgs.
"U.S. Appl. No. 15/152,975, Response filed Nov. 30, 2017 to Final Office Action dated Jun. 30, 2017", 9 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,359, Response filed Jan. 22, 2018 to Non Final Office Action dated Jul. 20, 2017", 13 pgs.
"U.S. Appl. No. 15/224,365, Response filed Feb. 8, 2018 to Non Final Office Action dated Aug. 8, 2017", 14 pgs.
"U.S. Appl. No. 15/224,372, Response filed Jan. 8, 2017 to Non Final Office Action dated Aug. 7, 2017", 22 pgs.
"U.S. Appl. No. 15/224,377, Final Office Action dated Jan. 2, 2018", 29 pgs.
"U.S. Appl. No. 15/224,377, Response filed Dec. 6, 2017 to Non Final Office Action dated Aug. 4, 2017", 22 pgs.
"U.S. Appl. No. 15/224,383, Final Office Action dated Feb. 14, 2018".
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Response filed Jan. 9, 2018 to Final Office Action dated Oct. 24, 2017", 17 pgs.
"Canadian Application Serial No. 2,894,332, Response filed Jan. 24, 2017 to Office Action dated Aug. 16, 2016", 15 pgs.
"European Application Serial No. 14804343.3, Extended European Search Report dated Sep. 29, 2016", 12 pgs.
"European Application Serial No. 15870874.3, Extended European Search Report dated Nov. 29, 2017", 7 pgs.

(56) References Cited

OTHER PUBLICATIONS

"International Application Serial No. PCT/US2015/037251, Written Opinion dated Sep. 29, 2015", 4 pgs.
Fajman, "An Extensible Message Format for Message Disposition Notifications", Request for Comments: 2298, National Institutes of Health, (Mar. 1998), 28 pgs.
"U.S. Appl. No. 15/137,608, Notice of Allowance dated Aug. 8, 2019", 7 pgs.
"U.S. Appl. No. 15/137,608, Response filed Jul. 12, 2019 to Final Office Action dated May 13, 2019", 10 pgs.
"U.S. Appl. No. 15/224,312, Advisory Action dated Aug. 27, 2019", 3 pgs.
"U.S. Appl. No. 15/224,312, Response filed Aug. 12, 2019 to Final Office Action dated Apr. 11, 2019", 14 pgs.
"U.S. Appl. No. 15/224,343, Response filed Aug. 22, 2019 to Final Office Action dated Mar. 22, 2019", 16 pgs.
"U.S. Appl. No. 15/224,355, Final Office Action dated Aug. 9, 2019", 15 pgs.
"U.S. Appl. No. 15/224,359, Response filed Sep. 11, 2019 to Final Office Action dated Apr. 11, 2019", 18 pgs.
"U.S. Appl. No. 15/224,365, Final Office Action dated Aug. 23, 2019", 12 pgs.
"U.S. Appl. No. 15/224,372, Response filed Jul. 8, 2019 to Final Office Action dated Mar. 6, 2019", 14 pgs.
"U.S. Appl. No. 15/702,511, 312 Amendment filed Jun. 26, 2019", 11 pgs.
"U.S. Appl. No. 15/702,511, PTO Response to Rule 312 Communication dated Aug. 13, 2019", 2 pgs.
"U.S. Appl. No. 15/729,582, Notice of Allowance dated Jul. 22, 2019", 9 pgs.
"U.S. Appl. No. 15/946,990, Response filed Jul. 9, 2019 to Final Office Action dated May 9, 2019", 12 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/219,577, Restriction Requirement dated Aug. 7, 2019", 6 pgs.
"U.S. Appl. No. 16/376,598, Non Final Office Action dated Jul. 25, 2019", 7 pgs.
"U.S. Appl. No. 16/511,834, Non Final Office Action dated Aug. 20, 2019", 11 pgs.
"U.S. Appl. No. 15/137,608, Corrected Notice of Allowability dated Oct. 2, 2019", 3 pgs.
"U.S. Appl. No. 15/224,312, Response filed Oct. 11, 2019 to Advisory Action dated Aug. 27, 2019", 17 pgs.
"U.S. Appl. No. 15/224,343, Non Final Office Action dated Nov. 12, 2019", 16 pgs.
"U.S. Appl. No. 15/224,355, Response filed Nov. 11, 2019 to Final Office Action dated Aug. 9, 2019", 14 pgs.
"U.S. Appl. No. 15/224,372, Non Final Office Action dated Oct. 16, 2019", 14 pgs.
"U.S. Appl. No. 15/224,377, Non Final Office Action dated Oct. 15, 2019", 12 pgs.
"U.S. Appl. No. 15/224,383, Non-Final Office Action dated Sep. 23, 2019", 13 pgs.
"U.S. Appl. No. 15/702,511, Notice of Allowability dated Sep. 30, 2019", 2 pgs.
"U.S. Appl. No. 15/729,582, Corrected Notice of Allowability dated Oct. 2, 2019", 3 pgs.
"U.S. Appl. No. 15/729,582, Corrected Notice of Allowability dated Oct. 30, 2019", 3 pgs.
"U.S. Appl. No. 15/946,990, Notice of Allowance dated Sep. 24, 2019", 5 pgs.
"U.S. Appl. No. 16/219,577, Non Final Office Action dated Oct. 29, 2019", 7 pgs.
"U.S. Appl. No. 16/219,577, Response filed Oct. 3, 2019 to Restriction Requirement dated Aug. 7, 2019", 6 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"U.S. Appl. No. 16/662,956, Preliminary Amendment filed Oct. 24, 2019", 8 pgs.
"Chinese Application Serial No. 201680027177.8, Office Action dated Oct. 28, 2019", W/English Translation, 15 pgs.
"European Application Serial No. 16716090.2, Communication Pursuant to Article 94(3) EPC dated Jan. 15, 2020", 6 pgs.
"Korean Application Serial No. 10-2019-7030235, Notice of Preliminary Rejection dated Nov. 28, 2019", w/English Translation, 10 pgs.

\* cited by examiner

GEO-FENCE AUTHORIZATION PROVISIONING

CLAIM OF PRIORITY

This application claims the benefit of U.S. Provisional Application Ser. No. 62/134,689, filed Mar. 18, 2015, which is hereby incorporated by reference in its entirety.

TECHNICAL FIELD

The subject matter disclosed herein relates generally to exchanging electronic content in a computer network. More particularly, certain examples relate to authorization processes for access to a geo-location restricted collection of content associated with an event or entity.

BACKGROUND

Mobile devices, such as smartphones, are used to generate content. The content may be text messages, photographs (with or without augmenting text) and videos. Users can share such content with individuals in their social network. However, there is no mechanism for sharing content with strangers that are participating in a common event or entity.

BRIEF DESCRIPTION OF THE FIGURES

Example embodiments will be more fully appreciated in connection with the following detailed description taken in conjunction with the accompanying drawings, in which.

Like reference numerals refer to corresponding parts throughout the several views of the drawings.

DETAILED DESCRIPTION

The provisioning of authorization to access content (e.g., a collection of content posted by users, such as a Snapchat Story) based on geolocation is a delicate matter. On the one hand, access should not be too restrictive, particularly with respect to potential contributors and posters who are located within a geo-fence associated with an event or location (e.g., on a university campus). On the other hand, privacy rights and other concerns may make it undesirable to simply provision content access to any user who is located within a geo-fence. Looking specifically at the example of a university campus, it may be undesirable (or even dangerous) to allow anyone simply located on the campus to access and view photographs and other content posted by students. Numerous technical challenges exist in the provisioning of such content access.

Various example methods are described for provisioning access to content based, not only on geolocation within a geo-fence, but also based on various secondary data and criteria. Such data includes, for example, communication identifiers (e.g., an email address) associated with an authorized entity or institution (e.g., indicating a domain of a particular university or company), as well as activity data regarding a user stored in a user profile that serves as the basis for supplemental authorization decisioning. Such activity data may include communications metadata (e.g., historical data regarding other content collections to which a particular user has had access) and device activity data (e.g., screenshot activity or image manipulation using geo-filters). Other secondary data that may be used includes device signature or setting information (e.g., a language setting) or a real-time image processing (e.g. using facial recognition).

This secondary data may be processed to determine whether a particular user has had sufficient and meaningful contacts with an entity or event, or with previous content collections associated with an event or entity (e.g., a previous Snapchat Story for a particular university campus). An example system for addressing of the technical challenges associated with the provisioning of content access within a geo-fence is described below.

Figure 1:
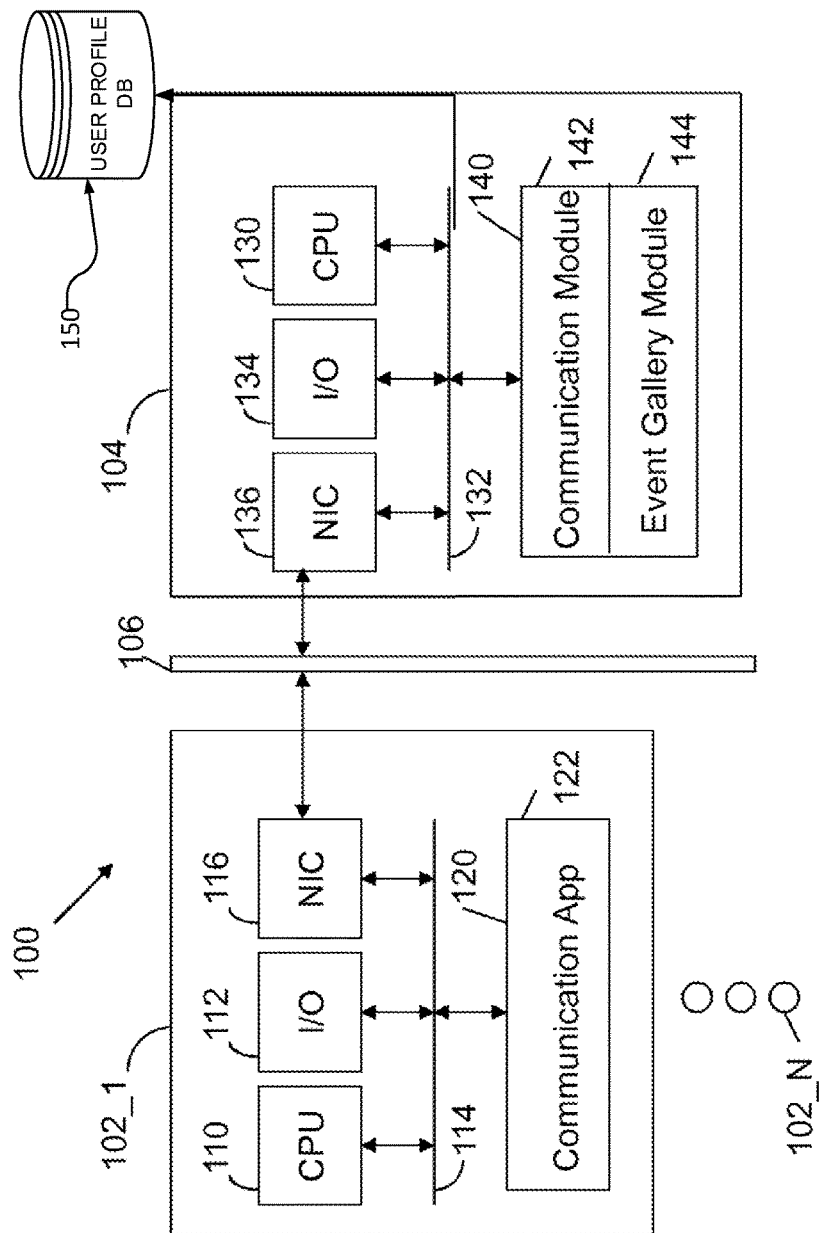
FIG. 1 illustrates a system configured in accordance with an embodiment.

FIG. 1 illustrates a system 100 configured in accordance with an embodiment. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a bus 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. A communication application 122 is implemented by CPU 110 to coordinate communications with server 104 and/or other client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. A communication module 142 is implemented by the CPU 130 to coordinate communications with client devices 102. An event gallery module 144 is implemented by the CPU 130 to store messages from participants in a live event. The messages form an event gallery, which may be supplied to a client device 102 in response to a request from a client device 102. The server 104 also includes or is connected to a database 150 that is accessible via the bus 132 by the communication module 142 and the event gallery module 144. The database 150 may operate as a user profile database and store a user profile table (described in further detail below) used for secondary authentication operations.

Figure 2:
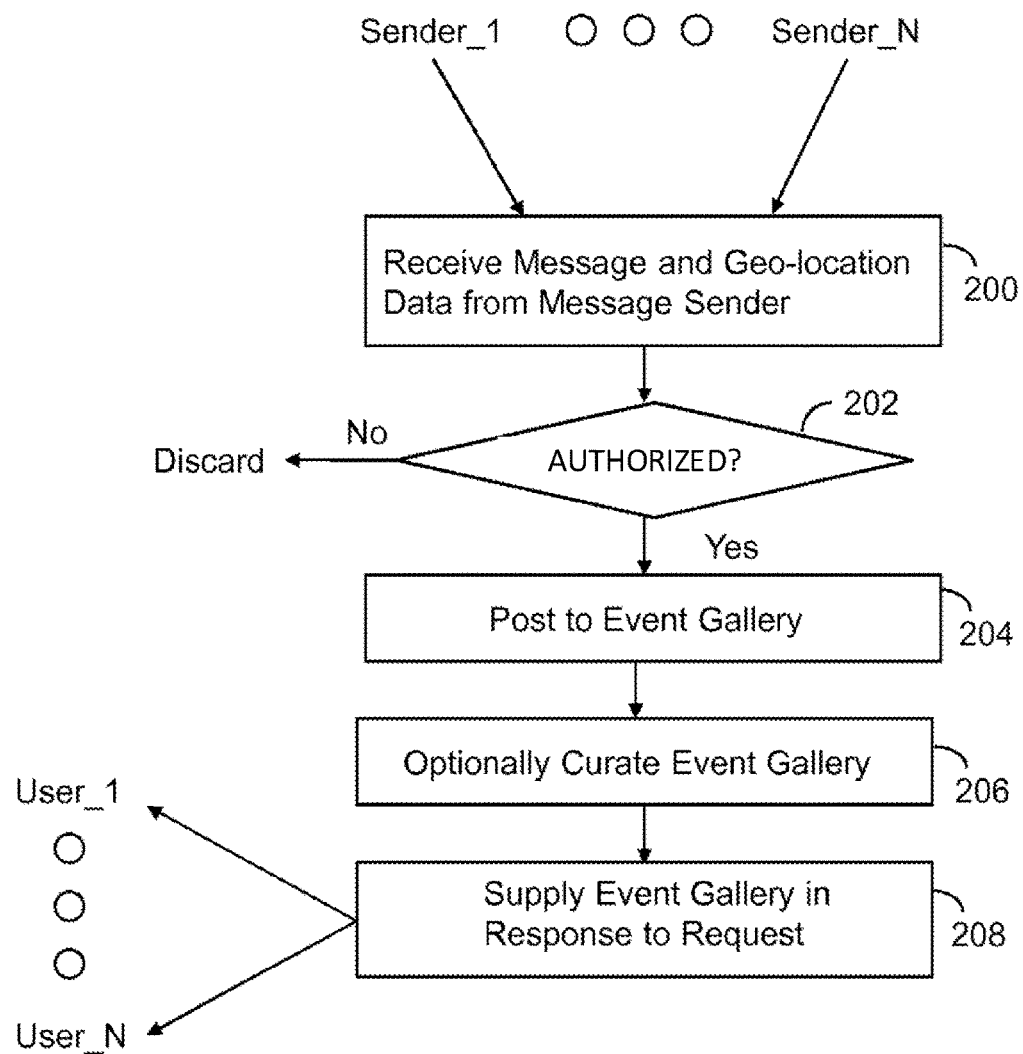
FIG. 2 illustrates server side processing associated with an embodiment.

FIG. 2 illustrates operations associated with an embodiment of the event gallery module 144. The top of the figure illustrates a set of message senders, e.g. Sender_1 through Sender_N. Each message sender is associated with a client device 102. The communication application 122 is configured to accompany a message with geo-location information. Typically, the geo-location information will be collected from a GPS chip resident in the client device. However, other geo-location information may also be used, such as cellular network geo-location information, self-reported geo-location information and the like.

The event gallery module 144 includes an administrative interface that allows one to define an event. For example, the administrative interface may prompt an event planner for event name, event description, event date, event time and event location. The event location is specified in physical coordinates (e.g., GPS coordinates) that define a geo-location fence associated with the event.

As previously indicated, messages from senders include geo-location information. The server 104 receives such messages and geo-location data 200 from any number of senders. For each message, an authorization process (or processes) (202) may be performed to authorize posting of content to an event gallery 204. For example, the geo-location data may be compared to the geo-location fence. If the message was not sent from within the geo-location fence, it is not from a permitted position and it is therefore discarded. If the message is from a permitted position, the message is posted to an event gallery 204. In other example embodiments, secondary authorization processes, as described in further detail below, may be performed in order to assess whether a message is to be posted to an event gallery 204, or alternatively discarded.

The event gallery module 144 may include a curation interface that allows an event planner to optionally curate the event gallery 206. For example, the curation interface may allow the event planner to delete inappropriate or redundant messages. The final operation of FIG. 2 is to supply the event gallery in response to requests 208 from any number of users.

Figure 3:
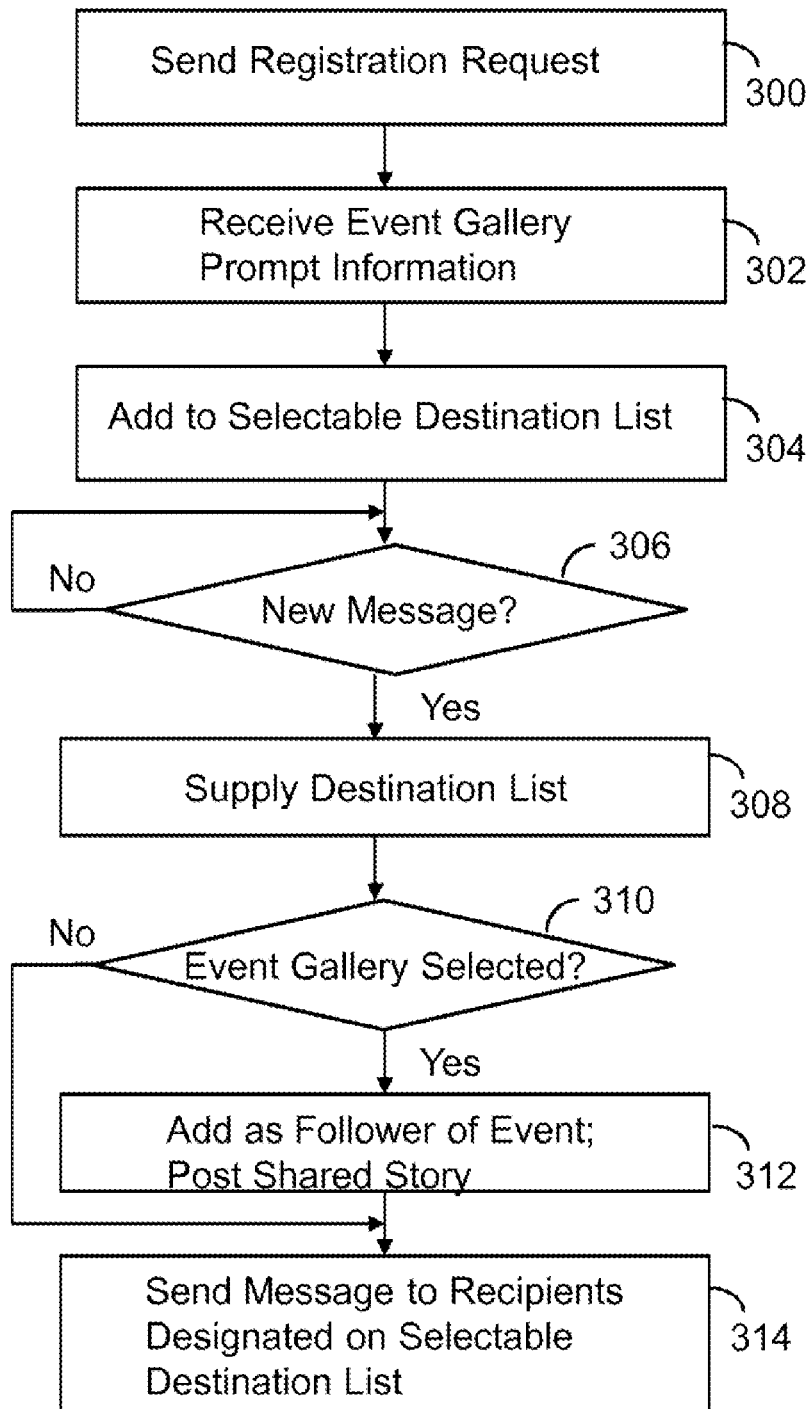
FIG. 3 illustrates client side processing associated with an embodiment.

FIG. 3 illustrates processing associated with the communication application 122 resident on a client device 102. The communication application 122 sends a registration request 300. The registration request may be an explicit request to join or follow an event. Alternately, the registration request may be triggered by sending geo-location data to server 104. The event gallery module 144 determines whether the client device is authorized to register to join or follow the event. For example, the event gallery module 144 may determine whether the geo-location data corresponds to a geo-location fence associated with an event. In other embodiments, secondary authorization processes, as described in further detail below, may be performed in order to assess whether the client device is authorized to join or follow the event.

Event gallery prompt information is received 302 in response to a request. The event gallery prompt information may be indicia of the event, such as a brand, a textual description and the like. The event gallery prompt information is added to a selectable destination list 304 (i.e., a list of recipients for a particular message or piece of content). The selectable destination list 304 includes individuals in a user's social network. In this case, the selectable destination list is augmented with indicia of an event.

If a user generates a message (306—Yes) the destination list is supplied 308. The destination list includes individuals in a user's social network and indicia of the event and/or event gallery. If the event gallery is selected (310), the user is added as a follower of the event 312. So, for example, in the case where the user received the event gallery prompt in response to simply communicating geo-location data, the user may formally follow the event by posting a message (shared story) to the event gallery. That is, the event gallery module 144 adds the user to a list of event followers in response to the user posting a message to the event gallery. Finally, messages are sent to recipients designated on the selectable destination list 314. These recipients may include individuals in the user's social network or have some other association with the user (e.g., common membership within a club, similar hobby, attended the same university, etc.).

Figure 4:
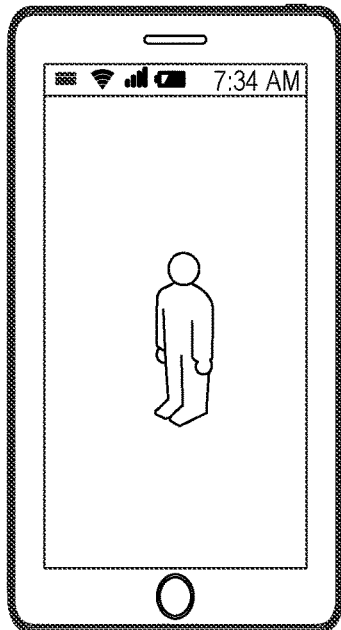
FIGS. 4-8 illustrate graphical user interfaces that may be associated with embodiments.
Figure 5:
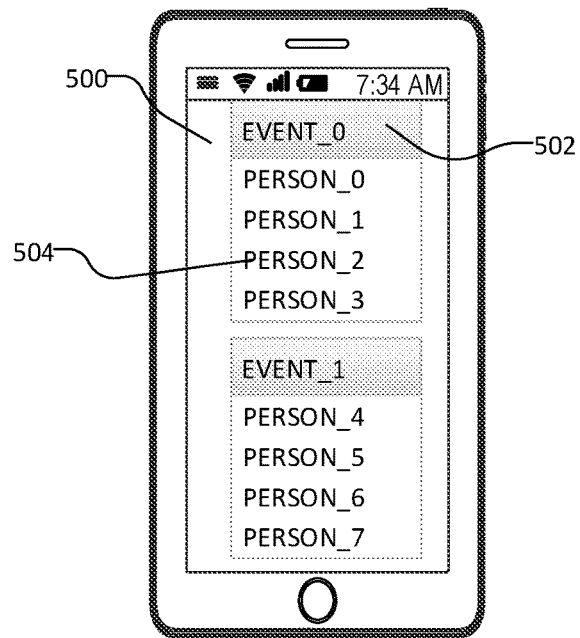
Figure 6:
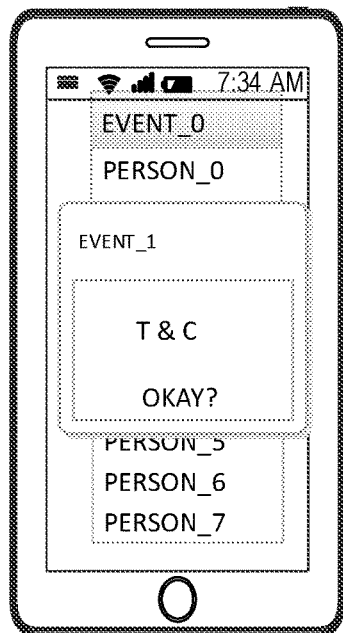
Figure 7:
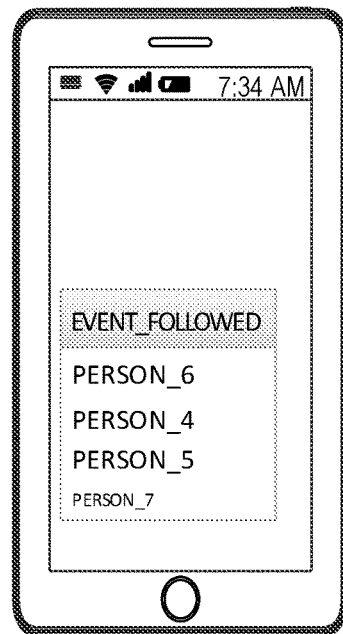

FIG. 4 is an example of a message taken at an event. In this example, the message is a photograph, which may be augmented with text or other graphic. FIG. 5 illustrates a selectable destination list 500. The selectable destination list 500 includes an entry for a live event 502 and entries 504 for individuals in a social network. Selecting the live event 502 (which may have as followers members from the user's social network as well as individuals or entities with no relation to the user) from the selectable destination list 500 may result in a prompt as shown in FIG. 6. The prompt may explain terms associated with posting content to the event gallery. FIG. 7 illustrates an interface listing friends in a social network and one or more events that are being followed.

Figure 8:
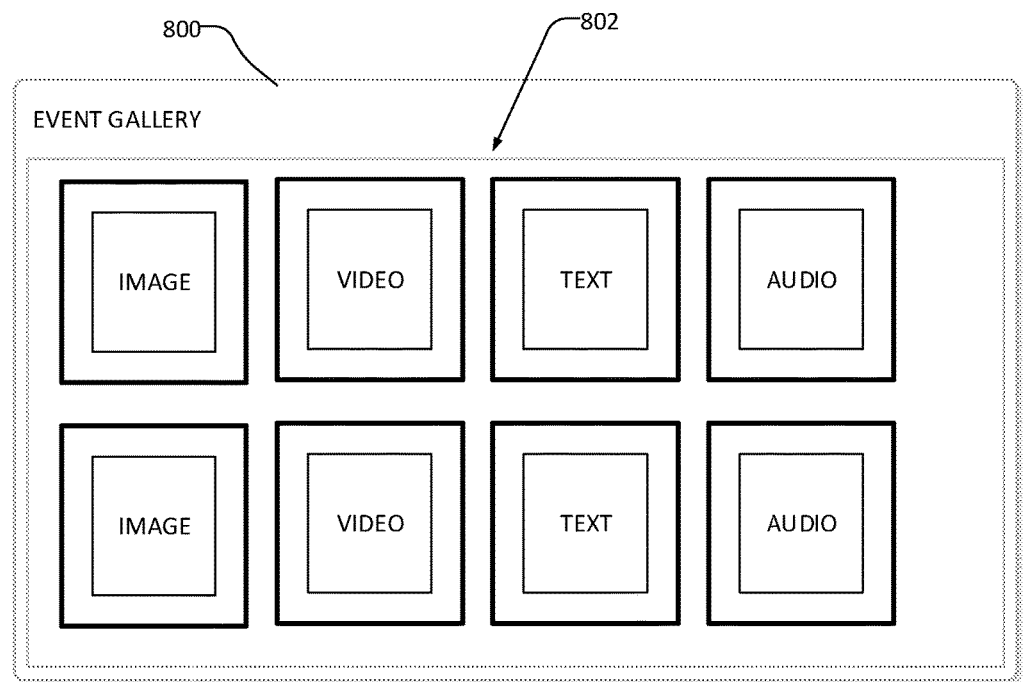

FIG. 8 is an example of an event gallery 800. The event gallery 800 includes individual posted content 802 (e.g., messages including images, video, text and audio). The event gallery 800 may be available for a specified transitory period. For example, the specified transitory period may be the duration of an event. Indicia of the event gallery may appear in a list of friends (e.g., destination list) for the duration of the event. In one embodiment, the event gallery has individual ephemeral messages shown in a sequence. For example, a first image is shown for five seconds, and then a second image is shown for three seconds, etc.

An event gallery may be open to all event participants. Alternately, an event gallery may be formed for a subset of participants selected from a destination list or some other list (e.g., a list of co-workers at an event). An embodiment maintains an ongoing event gallery (shared story) for a geo-location. For example, the shared story may extend over months. Alternately, the shared story may be renewed every twenty-four hour period at a specified geo-location.

Figure 9:
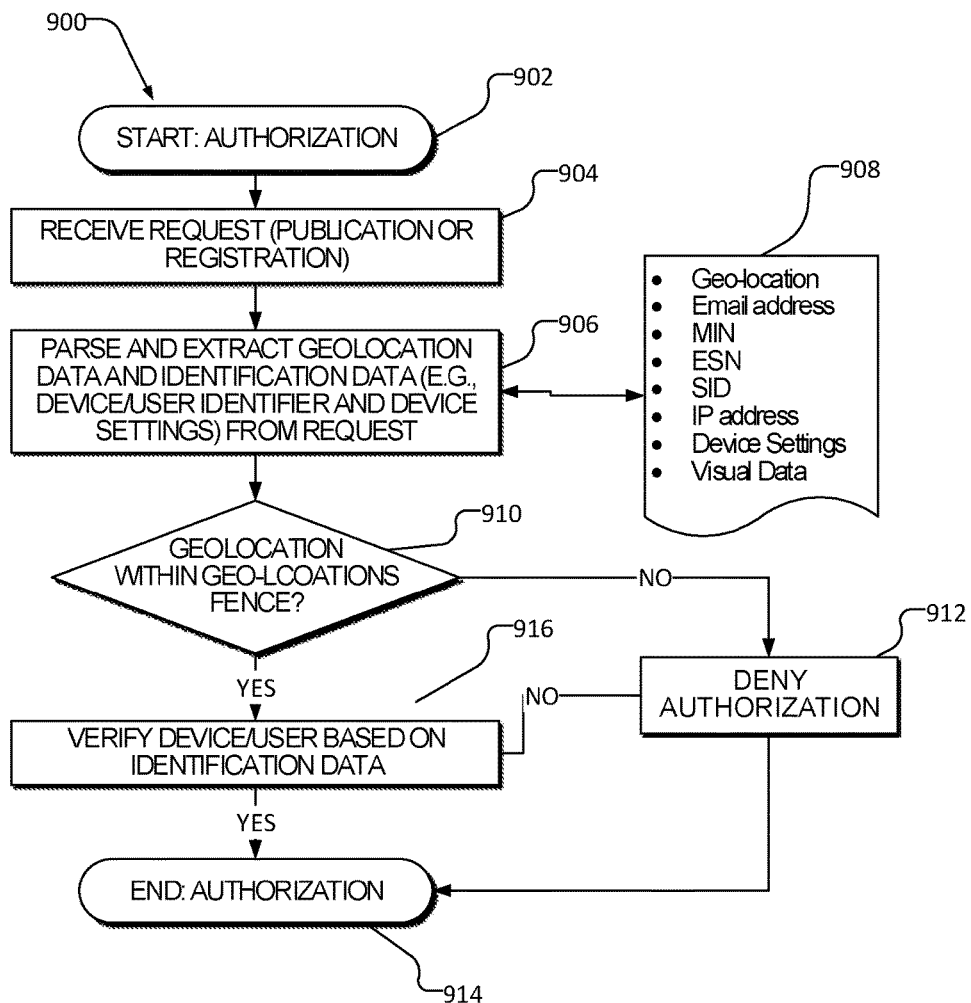
FIG. 9 is a flowchart illustrating a method, according to an example embodiment, of provisioning geo-fence authorization.

FIG. 9 is a flowchart illustrating a method 900, according to an example embodiment, to authorize postings of a message (or other content) to an event gallery. The method 900 may be used to perform authorization or verification operations as part of the operation 202 of FIG. 2 or as part of the registration operation 300 of FIG. 3.

The method 900 commences at operation 902 and is followed by the receipt, at operation 904, of a request from a device to post a message (or other content) to an event gallery, or to register to join or follow an event. The request is received by the communication module 142.

The request to post, join or follow includes geolocation data indicating a location of a requesting device (e.g., a smart phone) from which the request was received, as well as identification data identifying the requesting device or a user operating the requesting device. The geolocation data may, for example, be GPS coordinates provided by a GPS module of a client device 102, or location data determined by the client device 102 using Wi-Fi or cell tower triangulation. The identification data may include an email address of the operator of the client device 102, an identifier of the client device 102 (e.g., an Electronic Serial Number (ESN), a Mobile Identification Number (MIN), or a System Identification Code (SID), a device signature (e.g., generated using the settings of the client device 102), or an IP address of a wireless network via which the request was transmitted. The identification data may also include real-time visual data (e.g., a picture of the face of a sending user or of an environment in which the sending user is located).

At operation 906, the communication module 142 parses the received request, and extracts the geolocation data and identification data. The extracted data 908 is then provided by the communication module 1422 to the event gallery module 144.

At operation 910, the event gallery module 144 performs a first authorization operation, by determining whether the geolocation data, extracted from the request, corresponds to a geolocation fence associated with an event gallery for a specific event or entity. If the geolocation data does not correspond to the relevant geolocation fence, authorization is denied at operation 912, and the method 900 terminates at operation 914.

On the other hand, should the geolocation data correspond to the relevant geolocation fence, the event gallery module 144, at operation 916, performs a second authorization operation that includes using the identification data, extracted at operation 906, to verify an attribute of the user. This second authorization operation is useful for ensuring that only qualified users are able to contribute to the specific event gallery, or to join (or follow) an event for which the event gallery exists. If the second authorization operation fails, authorization is again denied at operation 912. The authorization method 900 terminates at operation 914.

The performance of the second authorization operation may involve any number of sub-operations using, for example, the identification data extracted at operation 906. These various sub operations may be performed against user profile data, stored as part of a user profile table (discussed below with reference to FIG. 10) in the database 150, which is accessed by the event gallery module 144.

In a first example authorization sub-operation, an email address included in the request is used to perform the second authorization. Specifically, the domain name portion of the email address (e.g., john@lmu.edu) may be compared against the domain name of an entity or organization (e.g., Loyola Marymount University) associated with an event. In this example, Loyola Marymount University (LMU) may be the location of a concert event John is seeking to join or follow, or the concert event may have an event gallery to which John is seeking to contribute.

In this sub-operation, the event gallery module 144 may also have access to a database of qualified email addresses for a particular entity or organization. For example, LMU, through agreement with an operator of the system 100, may provide access to a database of authorized email addresses for this university. In a further embodiment, email addresses may be verified against a database of entity email addresses source from a third party (e.g., a social networking site).

In a second example authorization sub-operation, an IP address included in the request may be used to perform the authorization. For example, authorization may be restricted to only those devices posting (or otherwise accessing) from a campus Wi-Fi network, where the relevant event is being hosted on a university campus (or the university is in some other way associated with the event).

Figure 10:
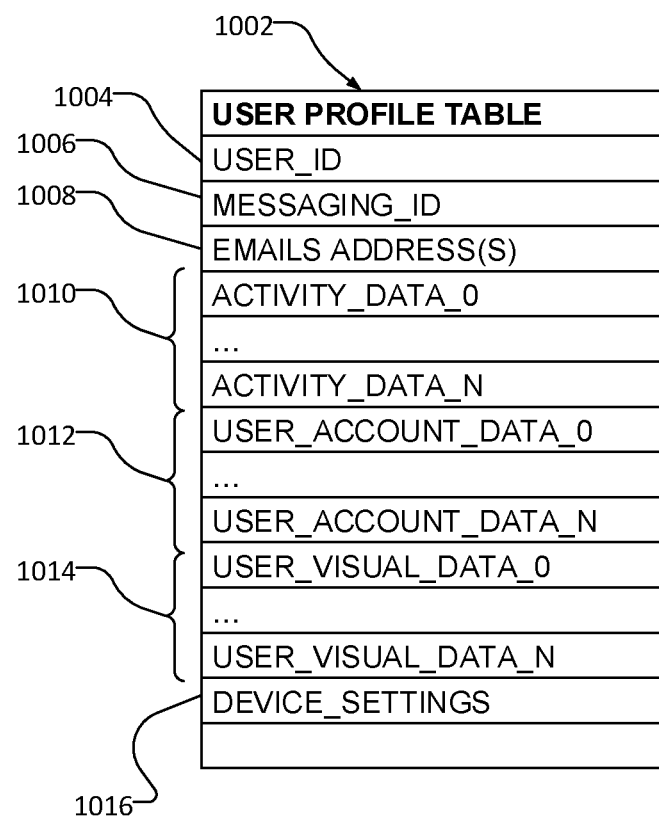
FIG. 10 is a table illustrating a user profile table, according to an example embodiment.

In further example authorization sub-operations, communications, activity and/or visual data included within a user profile is used as part of the second authorization process. FIG. 10 is a data diagram, illustrating an example user profile table 1002 that may be maintained within the database 150. The table 1002 is maintained by a user profile sub module of the event gallery module 144. Turning specifically to the user profile table 1002, the table is shown to include the following information for each user: a user identifier 1004, a messaging system identifier 1006 (e.g., an identifier used by the system 100), one or more email addresses 1008, multiple instances of activity data 1010 (e.g. a user's screen capture behavior or activity, image filter usage etc.), multiple instances of communications (or posting) data 1012 (e.g., contribution history to various event galleries or content collections for events) and multiple instances of user visual data 1014 (e.g., face or location images associated with the user). The user profile table 1002 may also include device setting data 1016. Other examples utilizable information include area code, phone number, etc. For example, the language setting of a user's phone may be a useful criterion for provisioning geo-fence authorization to users in specific countries or regions.

Returning to the description of authorization sub operations using historical activity, communications and/or visual data stored within a user profile table 1002, the following communications data may be used in authorization sub operations:

Recency of contributions to a specific event gallery (e.g., to an event gallery associated with the same (common) entity to which the user is now requesting to provide contributions).

Frequency of sending and receiving communications (e.g., ephemeral messages) to and from other users who have previously contributed to (or who are authorized to contribute to) the relevant event gallery.

Frequency of viewing event galleries (e.g., Snapchat Stories) of another user who previously contributed to a specific event gallery (e.g., an eligible Snapchat Story associated with the same entity (e.g. a university) hosting the event that the user is now seeking to join or follow).

Information or habits regarding a user's friends or contacts activity, including the level of their friends/contacts participation in a specific event gallery. Thus, a user may be granted access to a gallery if a certain number of his or her friends (or phone contacts from his/her device) have participated in posting to the gallery.

Completion of a past event gallery (e.g., access to first and last content items in a gallery sequence), indicating an intimacy or connectedness with an event gallery to which the user may now be seeking access.

Activity data 1010, which provides a history of user activities with respect to a specific application (e.g., the communications application 122) may likewise be used in an authorization sub-operation. Examples of such activity data include data indicating whether a user has applied a image filter (e.g., a Snapchat geo-filter) that is relevant to a particular location or event (e.g., a geo-filter that is associated with a specific university campus), or viewed an image/collection of images to which such a location-relevant image filter has been applied. Similarly, a user's preferences for a particular activity (e.g., a user's hobby), as determined by web browsing or other activity may be used to as well.

The activity data 1010 may also record a user's screen capture (e.g., "screenshotting") behavior or activity on a mobile device, which can also be applied in the authorization sub-operation. Consider that a user may have performed a screen capture operation on a mobile device at a particular location which is within a geo-fence, or sufficiently proximate to a location associated with an event. This information may be computed and used in the authorization sub-operation.

In one example, the user visual data 1014 is used in provisioning geo-fence authorization by determining whether a user's face was previously presented in an approved event gallery. If so, the user's face may be associated with a user account from "selfies" that the user captured using a mobile device or camera. In this example, a real-time-image of a user's face (or data generated from such an image) is included in the request received at operation 904. This real-time image data may be compared against the user visual data 1014 to verify the user, and also compared against images (e.g., selfies) present in another event gallery associated with an authorized entity (e.g., to determine whether a "selfie" depicting the user is present in another Snapchat Story approved for a particular university). If such a correlation is detected, geo-fence authorization may be approved at operation 916.

The device setting data 1016 (e.g., language settings), may also be used as an authorization sub-operation to provision geo-fence authorization in specific regions. For example, where the language settings of a particular device indicate a specific language preference (e.g., German), access to an event gallery for an event occurring in Germany may be selectively authorized based on the determined language preference.

In addition to the examples described above, other concepts are also utilizable as an authorization sub-operation, including express actions required of the user. For example, in some embodiments, a user may be prompted for a password required for access to a gallery.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

Figure 11:
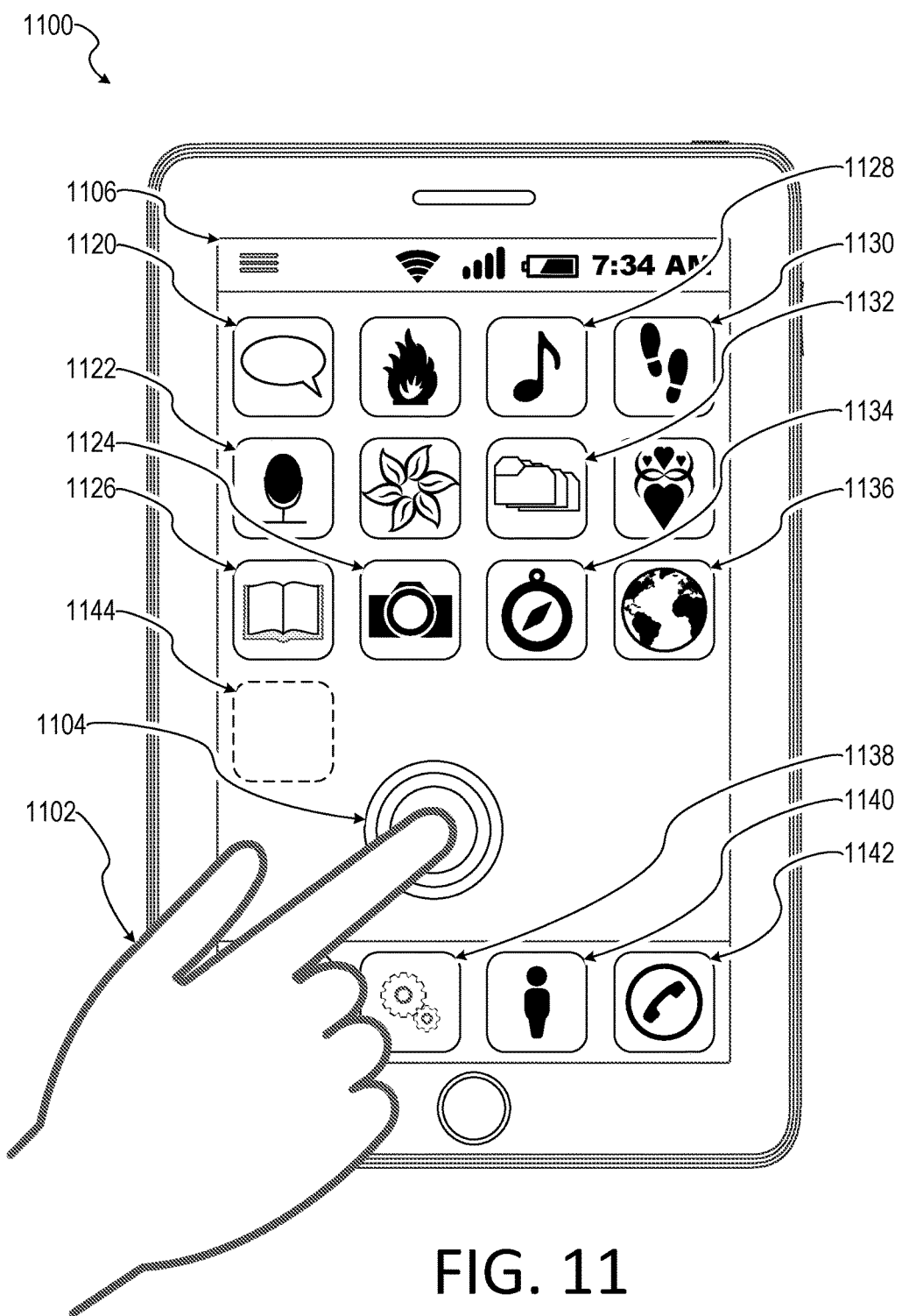
FIG. 11 illustrates an example mobile device that may be executing a mobile operating system, according to an example embodiment.

FIG. 11 illustrates an example mobile device 1100 that may be executing a mobile operating system (e.g., iOS™, Android™, Windows® Phone, or other mobile operating systems), according to example embodiments. In one embodiment, the mobile device 1100 may include a touch screen that may receive tactile information from a user 1102. For instance, the user 1102 may physically touch 1104 the mobile device 1100, and in response to the touch 1104, the mobile device 1100 may determine tactile information such as touch location, touch force, gesture motion, and so forth. In various example embodiment, the mobile device 1100 may display home screen 1106 (e.g., Springboard on iOS™) that the user 1102 of the mobile device 1100 may use to launch applications and otherwise manage the mobile device 1100. In various example embodiments, the home screen 1106 may provide status information such as battery life, connectivity, or other hardware status. The home screen 1106 may also include a plurality of icons that may be activated to launch applications, for example, by touching the area occupied by the icon. Similarly, other user interface elements may be activated by touching an area occupied by a particular user interface element. In this manner, the user 1102 may interact with the applications.

Many varieties of applications (also referred to as "apps") may be executing on the mobile device 1100. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 1100 may include a messaging app 1120, audio recording app 1122, a camera app 1124, a book reader app 1126, a media app 1128, a fitness app 1130, a file management app 1132, a location app 1134, a browser app 1136, a settings app 1138, a contacts app 1140, a telephone call app 1142, other apps (e.g., gaming apps, social networking apps, biometric monitoring apps), a third party app 1144, and so forth.

Software Architecture

Figure 12:
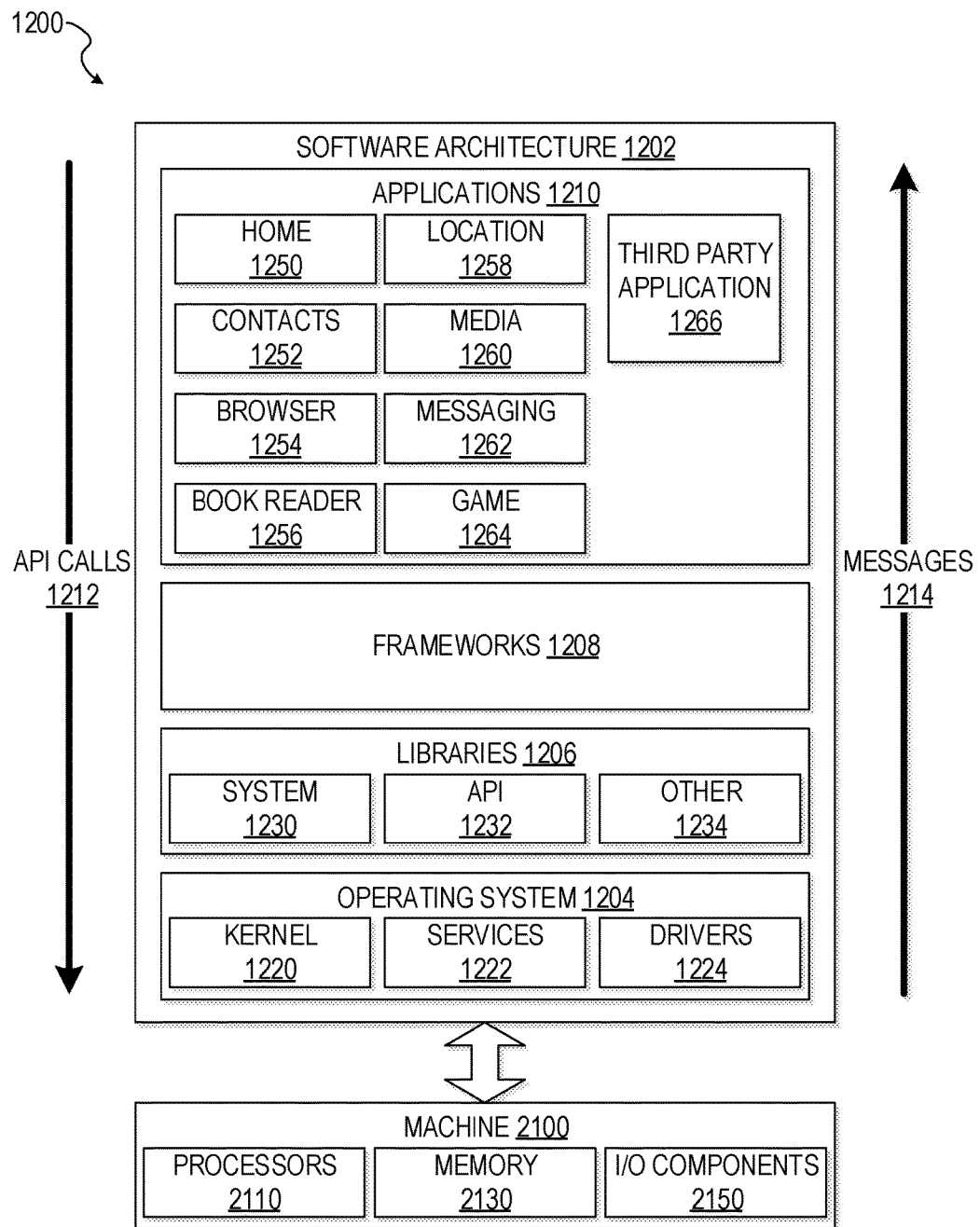
FIG. 12 is a block diagram illustrating architecture of software, which may be installed on any one or more of devices described above.

FIG. 12 is a block diagram 1200 illustrating an architecture of software 1202, which may be installed on any one or more of devices described above. FIG. 12 is merely a non-limiting example of a software architecture and it will be appreciated that many other architectures may be implemented to facilitate the functionality described herein. The software 1202 may be executing on hardware such as machine 1300 of FIG. 13 that includes processors 1310, memory 1330, and I/O components 1350. In the example architecture of FIG. 12, the software 1202 may be conceptualized as a stack of layers where each layer may provide particular functionality. For example, the software 1202 may include layers such as an operating system 1204, libraries 1206, frameworks 1208, and applications 1210. Operationally, the applications 1210 may invoke application programming interface (API) calls 1212 through the software stack and receive messages 1214 in response to the API calls 1212.

The operating system 1204 may manage hardware resources and provide common services. The operating system 1204 may include, for example, a kernel 1220, services 1222, and drivers 1224. The kernel 1220 may act as an abstraction layer between the hardware and the other software layers. For example, the kernel 1220 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1206 may provide a low-level common infrastructure that may be utilized by the applications 1210. The libraries 1206 may include system 1230 libraries (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1206 may also include a wide variety of other libraries 1234 to provide many other APIs to the applications 1210.

The frameworks 1208 may provide a high-level common infrastructure that may be utilized by the applications 1210. For example, the frameworks 1208 may provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

The applications 1210 include a home application 1250, a contacts application 1252, a browser application 1254, a book reader application 1256, a location application 1258, a media application 1260, a messaging application 1262, a game application 1264, and a broad assortment of other applications such as third party application 1266. In a specific example, the third party application 1266 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1266 may invoke the API calls 1212 provided by the mobile operating system 1204 to facilitate functionality described herein.

Example Machine Architecture and Machine-Readable Medium

Figure 13:
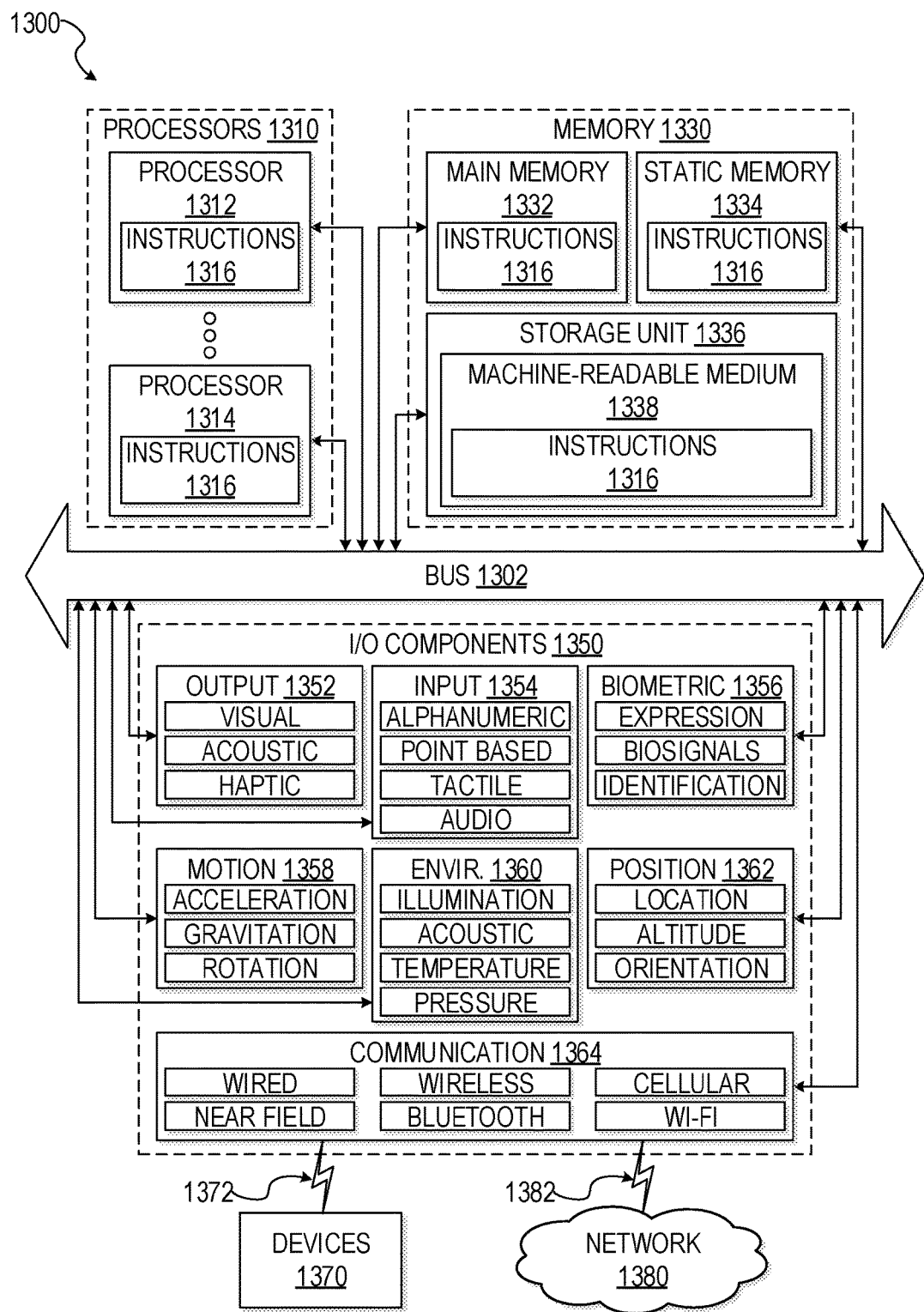
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (also referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory 1330 may include a main memory 1332, a static memory 1334, and a storage unit 1336 accessible to the processors 1310 via the bus 1302. The storage unit 1336 may include a machine-readable medium 1338 on which is stored the instructions 1316 embodying any one or more of the methodologies or functions described herein. The instructions 1316 may also reside, completely or at least partially, within the main memory 1332, within the static memory 1334, within at least one of the processors 1310 (e.g., within the processor's cache memory), or any suitable combination thereof, during execution thereof by the machine 1300. Accordingly, the main memory 1332, static memory 1334, and the processors 1310 may be considered as machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 may include a wide variety of components to receive input, provide output, produce output, transmit information, exchange information, capture measurements, and so on. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Furthermore, the machine-readable medium 1338 is non-transitory (in other words, not having any transitory signals) in that it does not embody a propagating signal. However, labeling the machine-readable medium 1338 as "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method, comprising:
receiving a request to post content to an event gallery associated with an event, the request including:
geo-location data for a device sending the content, and
identification data identifying at least one of the device or a user of the device; performing a first authorization operation including determining that the geo-location data corresponds to a geo-location fence associated with the event;
performing a second authorization operation including using the identification data to verify an attribute of the user, the verifying the attribute comprising:
identifying contribution history of the user to one or more event galleries; and
determining that the user interacted with image modification data associated with at least one of the event and a location within the geo-location fence; and
based on the first and second authorization operations, posting the content to the event gallery.

2. The computer implemented method of claim 1, wherein the identification data comprises an IP address, and the second authorization operation comprises verifying that the IP address relates to an organization associated with the event.

3. The computer implemented method of claim 1, further comprising locating a user profile, associated with the user, stored in a database, and wherein the second authorization operation includes extracting user profile data from the user profile in the database in order to verify the attribute of the user.

4. The computer implemented method of claim 1, wherein the event and further event are both related to a common entity.

5. The computer implemented method of claim 1, wherein the verifying the attribute further comprises identifying at least one communication with a further user, the further user having made at least one communications contribution to a further event gallery associated with a further event.

6. The computer implemented method of claim 1, wherein the attribute comprises a user activity attribute.

7. The computer implemented method of claim 1, wherein the request includes real-time visual data captured using the device, the attribute further comprises a user visual attribute, and the verifying the attribute further comprises comparing visual data of the user profile data with the real-time visual data.

8. The computer implemented method of claim 1, wherein the event gallery is available for a specified transitory period.

9. The computer implemented method of claim 1, wherein the event gallery comprises individual ephemeral messages shown in sequence.

10. A system comprising: at least one processor; and
at least one memory storing instructions that, when executed by the at least one processor, configure the system to:
receive a request to post content to an event gallery associated with an event, the request including:
geo-location data for a device send the content, and
identification data identify at least one of the device or a user of the device;
perform a first authorization operation including determining that the geo-location data corresponds to a geo-location fence associated with the event;
perform a second authorization operation including using the identification data to verify an attribute of the user, the verifying the attribute comprising:
identifying contribution history of the user to one or more event galleries; and
determining that the user interacted with image modification data associated with at least one of the event and a location within the geo-location fence; and
based on the first and second authorization operations, post the content to the event gallery.

11. The system of claim 10, wherein the identification data comprises an IP address, and the second authorization operation comprises verify that the IP address relates to an organization associated with the event.

12. The system of claim 10, wherein the instructions further configure the system to locate a user profile, associated with the user, stored in a database, and wherein the second authorization operation includes extracting user profile data from the user profile in the database in order to verify the attribute of the user.

13. The system of claim 10, wherein the event and further event are both related to a common entity.

14. The system of claim 10, wherein t the verifying of the attribute further comprises identifying at least one communication with a further user, the further user having made at least one communications contribution to a further event gallery associated with a further event.

15. The system of claim 10, wherein the attribute comprises a user activity attribute.

16. The system of claim 10, wherein the request includes real-time visual data captured use the device, the attribute comprises a user visual attribute, and the verifying of the attribute further comprises comparing visual data of the user profile data with the real-time visual data.

17. A system comprising:
a communication component, implemented using at least one processor, to receive a request to post content to an event gallery associated with an event, the request including:
geo-location data for a device sending the content, and
identification data identifying at least one of the device or a user of the device; and an event gallery component to:
- perform a first authorization operation that includes determining that the geo-location data corresponds to a geo-location fence associated with the event;
- perform a second authorization operation that includes using the identification data to verify an attribute of the user, the verifying the attribute comprising:
  - identifying contribution history of the user to one or more event galleries; and
  - determining that the user interacted with image modification data associated with at least one of the event and a location within the geo-location fence; and
- based on the first and second authorization operations, post the content to the event gallery.

18. The system of claim 17, wherein the attribute comprises a user activity attribute.

19. The system of claim 17, wherein the request includes real-time visual data captured using the device, the attribute comprises a user visual attribute, and the verifying the attribute further comprises comparing visual data of the user profile data with the real-time visual data.

* * * * *